(12) United States Patent
Layher et al.

(10) Patent No.: US 11,713,992 B2
(45) Date of Patent: Aug. 1, 2023

(54) GAS METER AND ASSOCIATED METHODS

(71) Applicant: Ventbuster Holdings Inc., Airdrie (CA)

(72) Inventors: Robert Wayne Layher, Airdrie (CA);
Deanne Rose Layher, Airdrie (CA);
Scott Robert Layher, Calgary (CA)

(73) Assignee: Ventbuster Holdings Inc., Airdrie (CA)

( * ) Notice: Subject to any disclaimer, the term of this patent is extended or adjusted under 35 U.S.C. 154(b) by 0 days.

(21) Appl. No.: 17/963,310

(22) Filed: Oct. 11, 2022

(65) Prior Publication Data
US 2023/0041777 A1 Feb. 9, 2023

Related U.S. Application Data

(63) Continuation of application No. 16/893,835, filed on Jun. 5, 2020, now Pat. No. 11,486,751, which is a (Continued)

(51) Int. Cl.
| *G01F 1/684* | (2006.01) |
|---|---|
| *G01F 1/86* | (2006.01) |
| *G01F 1/696* | (2006.01) |
| *G01F 1/688* | (2006.01) |
| *G01F 1/7086* | (2022.01) |
| *G01F 15/04* | (2006.01) |

(Continued)

(52) U.S. Cl.
CPC ............. *G01F 1/86* (2013.01); *E21B 47/06* (2013.01); *G01F 1/684* (2013.01); *G01F 1/6842* (2013.01); *G01F 1/6884* (2013.01); *G01F 1/6965* (2013.01); *G01F 1/7086* (2013.01); *G01F 15/04* (2013.01); *G01F 25/15* (2022.01); *E21B 47/103* (2020.05); *G01F 1/7084* (2013.01); *G01N 21/3504* (2013.01); *G01N 2201/0221* (2013.01)

(58) Field of Classification Search
CPC ............. G01F 1/684; G01F 1/6842; G01F 1/86
See application file for complete search history.

(56) References Cited

U.S. PATENT DOCUMENTS

| 5,297,427 A | 3/1994 | Shambayati | |
|---|---|---|---|
| 6,216,726 B1* | 4/2001 | Brown et al. ............ | G01F 1/88 |
| | | | 137/486 |

(Continued)

FOREIGN PATENT DOCUMENTS

| EP | 1118863 A2* | 7/2001 | ............. F16K 1/123 |
|---|---|---|---|
| JP | 60209116 A | 10/1985 | |

(Continued)

OTHER PUBLICATIONS

Communication Pursuant to Article 94(3) EPC, European Patent Office, Dated Jun. 9, 2022 for European Patent Application No. 17880282.3.

(Continued)

*Primary Examiner* — Herbert K Roberts
(74) *Attorney, Agent, or Firm* — Reichel Stohry Dean LLP; Mark C. Reichel; Natalie J. Dean

(57) ABSTRACT

A device which: optically detects the presence of, measures the flow rate of, and identifies the characteristics of venting fugitive gas emissions. Specifically the device provides a spectral analysis of emission gas constituents; selective detection of the presence of venting hydrocarbons; measurement of venting emissions flow rates, the measurement of shut-in and flowing venting system pressures and the venting system temperatures. The flow rates are corrected, relative to the detection of the gas constituents and standard temperature and pressure (STP). These devices are configured to collect such data electronically and transmit via various telemetry systems, to a secure remote data network for reporting, access, evaluation, real-time monitoring and archiving as required.

15 Claims, 14 Drawing Sheets

Related U.S. Application Data

(63) continuation of application No. 15/839,255, filed on Dec. 12, 2017, now Pat. No. 10,684,154.

(60) Provisional application No. 62/433,112, filed on Dec. 12, 2016.

(51) Int. Cl.
| | |
|---|---|
| *G01F 15/04* | (2006.01) |
| *G01F 25/10* | (2022.01) |
| *E21B 47/06* | (2012.01) |
| *G01N 21/3504* | (2014.01) |
| *E21B 47/103* | (2012.01) |
| *G01F 1/7084* | (2022.01) |

(56) References Cited

U.S. PATENT DOCUMENTS

| | | | |
|---|---|---|---|
| 6,319,191 | B1 | 11/2001 | Sayet et al. |
| 7,000,463 | B1 | 2/2006 | Shajii et al. |
| 7,685,874 | B2 | 3/2010 | Nakano et al. |
| 7,886,593 | B2* | 2/2011 | Inagaki et al. ....... G05D 7/0635 73/203 |
| 8,261,819 | B1 | 9/2012 | Gibbs et al. |
| 8,650,946 | B1 | 2/2014 | Feller |
| 2007/0017285 | A1* | 1/2007 | Wang et al. ............. G01F 1/68 73/204.26 |
| 2009/0000389 | A1 | 1/2009 | Redon |
| 2011/0040501 | A1 | 2/2011 | Martin et al. |
| 2011/0132592 | A1 | 6/2011 | Apple et al. |
| 2015/0277447 | A1* | 10/2015 | Schmidt .............. G01F 15/003 137/486 |
| 2016/0223436 | A1 | 8/2016 | Caruso et al. |
| 2017/0219455 | A1 | 8/2017 | Mangal et al. |
| 2020/0064319 | A1 | 2/2020 | McNulty et al. |

FOREIGN PATENT DOCUMENTS

| | | | |
|---|---|---|---|
| JP | 05107092 A * | 4/1993 | |
| JP | 05180670 A | 7/1993 | |
| JP | 2001041798 A * | 2/2001 | |
| JP | 2011203075 A | 10/2011 | |

OTHER PUBLICATIONS

Examination report No. 1 for standard patent application, Australian Patent Office (IP Australia), Dated Oct. 25, 2021 for Australian Patent Application No. 2017376976.

Examination report No. 2 for standard patent application, Australian Patent Office (IP Australia), Dated Jan. 25, 2022 for Australian Patent Application No. 2017376976.

Examiner's Requisition, Canadian Intellectual Property Office, Dated Jul. 20, 2022 for Patent Application No. 3,046,818.

Office Action, Mexican Patent Office (Instituto Mexicano de la Propriedad Industrial (IMPI)), Dated Jul. 18, 2022 for Mexican Patent Application No. MX/a/2019/006808.

Extended European Search Report, European Patent Office, Dated Jun. 24, 2020 for European Patent Application No. 17880282.3.

* cited by examiner

658b

658b 663a  663c,d  663e
663b

GAS METER AND ASSOCIATED METHODS

RELATED APPLICATIONS

The present application claims priority to, and is a continuation of, U.S. Pat. Application No. 16/893,835 (title: Gas Meter and Associated Methods, filing date: Jun. 5, 2020) which is related to, and claims priority to, and is a continuation of, U.S. Pat. Application No. 15/839,255 (title: Gas Meter and Associated Methods, filing date: Dec. 12, 2017) which is related to, and claims priority to, U.S. Provisional Pat. Application No. 62/433,112 (title: Gas Meter and Associated Methods, filing date: Dec. 12, 2016), and the contents of each referenced document are hereby incorporated by reference.

FIELD

The invention relates to gas meters and associated methods. In particular, the invention relates to a metering device capable of qualifying and quantifying fugitive gas emissions.

BACKGROUND

In the field of oil and gas well abandonments there are issues arising in the measurement and remediation of surface casing vent flows (SCVF), which primarily consist of methane emissions. Taking Alberta, Canada as an example, the Alberta Energy Regulator (AER) statistics from 2013, state that a total of 430,000 wells have been drilled in Alberta. Of those, 151,000 have been abandoned. This leaves 279,000 producing or suspended wells to which testing and monitoring SCVF regulations for venting methane emissions apply. The occurrence of active SCVF ranges upwards to 18% of this well count, representing just over 50,000 wells leaking fugitive methane emissions to the atmosphere. The other two provinces of British Columbia and Saskatchewan combined, would represent an additional 40% of the Alberta estimates.

The Alberta Energy Regulator (AER) regulations state that all producing, shut-in, and inactive wells must be inspected and SCVF (Surface Casing Vent Flow) tested on a regular basis. All wells to be abandoned must be SCVF tested upon commencing abandonment operations and prior to cutting and capping for reclamation.

Additionally, on average a range of 6,000-18,000 wells are drilled in any one-year in Alberta. The Alberta Energy Regulator (AER) dictates that all newly drilled wells must to be SCVF tested and reported within 90 days of rig release.

The Alberta Energy Regulator (AER) has a recommended procedure for the above testing operation for the measurement of oil and gas well surface casing vent flows (SCVF) as outlined in AER Well Abandonment Directive 20 and Interim Directive ID 2003-01.

A "bubble test" is currently used to measure fugitive gas emissions from an oil and gas well casing vents. Fittings are attached to the surface casing vent and either a ¼″ (0.635 mm) or ½″ (12.7 mm) tube is placed into 1″ (25.4 mm) of water in a bottle, an on-site operator watches the bottle and tries to count the bubbles that occur within the 10 minute regulatory period. There are many reasons why this method may give inaccurate flow results: different size tubes cause different bubble volumes; operator subjectivity in what constitutes a bubble; too many bubbles to count; intermittent emissions may not be present during the timeframe; no determination if the bubble is air or hydrocarbon; and the most important deficiency is the lack of a direct and accurate measurement to qualify and quantify flow rate for these fugitive emissions. Neither does Industry currently have the technology to establish a scientifically proven baseline for fugitive methane emissions to the atmosphere.

SUMMARY

In accordance with the invention, there is provided a gas meter comprising:
- a channel comprising a modifiable (or adjustable) channel portion with a modifiable (or adjustable)cross-sectional area; and
- a thermal mass flow meter positioned within the modifiable (or adjustable) channel and which measures the mass flow rate by heating a portion of the flowing fluid and then recording how that heat is distributed or dispersed by the flow.

The cross-sectional area of the channel portion may be modifiable to control the velocity through the modifiable channel portion for a given flow rate. That is, the cross-sectional area of the channel portion may be modifiable to change the velocity through the modifiable channel portion without significantly changing the volumetric flow. That is, the technology may be configured to adjust the flow velocity so that the volumetric flow can be measured accurately by the thermal mass flow meter, not that the modifiable channel portion restricts or prevents flow. The modifiable (or adjustable) channel portion may comprise multiple configurations. In some of embodiments all of the multiple configurations may be configured to permit fluid flow through the channel.

The gas meter may be configured (automatically) to control the cross-sectional area of the modifiable (or adjustable) channel based on the gas flow rate.

Allowing the cross-sectional area of the adjustable or modifiable channel may allow the flow rate to be measured more accurately and/or may allow the dynamic range of the gas meter to be expanded. In some embodiments, the gas meter comprises moveable parts which can be suitably adjusted and modified to change adjust the cross-sectional area of the adjustable channel portion. Other embodiments may be modifiable by the application of separate parts to the gas meter such as the insertion of a particular replaceable module.

The thermal mass flow meter may be configured to take into account one or more of the following: the temperature of the atmosphere, the pressure of the atmosphere, the (flowing) temperature of the gas, the (flowing) pressure of the gas, and the composition of the gas. That is, the meter is configured to measure the temperature of the flowing gas, and the pressure of the flowing gas. The gas meter may comprise sensors to measure one or more of these parameters.

The gas meter may be configured to repeat the mass flow rate measurements at different cross-sectional areas.

The adjustable channel may comprise an adjustable obstruction, which can be moved (or otherwise adjusted) within the channel to change the cross-sectional area of the adjustable channel portion. The adjustable obstruction may move along an axis transverse to the channel axis to change the cross-sectional area of the adjustable channel portion. The thermal mass flow meter may be mounted on the adjustable obstruction or in a surface within the channel (e.g. on a channel surface opposite the adjustable obstruction).

The adjustable obstruction may comprise a plunger or piston (e.g. one which can be adjusted by being moved within the channel to modify the channel). The adjustable obstruction may be made of polymer (or other thermally insulating material). This may help prevent the obstruction acting as a heat sink or heat bridge for the thermal mass flow meter (e.g. MEMS chip).

The modifiable channel may be modifiable automatically (e.g. in response to a particular detected flow rate or flow rate range, or according to a predetermined program) or manually.

The channel may be modified by replacing at least a portion of a channel with different channel module portions (e.g. detachable modules). Each channel module portion may have a predetermined (e.g. and fixed) cross-sectional area. That is, the channel may comprise a replaceable channel module portion, wherein the replaceable channel module portion is configured to provide the modifiable channel portion with a predetermined and fixed cross-sectional area such that the cross-sectional area of the channel can be modified by replacing the replaceable channel module portion with another the replaceable channel module portion with a different predetermined and fixed cross-sectional area. It will be appreciated that the gas meter may be supplied as a kit comprising the gas meter body with a plurality of different replaceable channel module portions.

The modifiable channel portion may be configured to have a minimum cross section of between 1 and 5 mm$^2$. The modifiable channel portion may be configured to have a minimum cross section of between 0.5 and 1 mm$^2$. The modifiable channel portion may be configured to have a minimum cross section of less than 0.5 mm$^2$. The minimum flow cross sectional area may be around 0.1-0.2 mm$^2$. The maximum flow cross sectional area may be around 100 mm$^2$. The maximum flow cross sectional area may be around 200 mm$^2$. The maximum flow cross sectional area may be around 500 mm$^2$.

The gas meter may be configured to control the cross-sectional area of the modifiable channel portion based on the gas flow rate such that at high flow rate the cross-sectional area of the modifiable channel portion is larger than at low flow rate.

The gas meter may be configured to measure flow rates as low as 0.01 ml/min. The gas meter may be configured to measure flow rates as low as 0.005 ml/min. The gas meter may be configured to measure flow rates as low as 0.001 ml/min. The gas meter may be configured to measure flow rates lower than 0.01 ml/min.

The dynamic range of the gas meter may be greater than 20,000,000, wherein the dynamic range is defined as the ratio of the highest measureable flow rate to the lowest measureable flow rate. The dynamic range of the gas meter may be greater than 15,000,000. The dynamic range of the gas meter may be greater than 10,000,000. The dynamic range of the gas meter may be greater than 1,000,000.

The adjustable obstruction may be streamlined (e.g. by being tapered) to promote laminar flow across the flow meter. The adjustable obstruction may be elongate with the adjustable obstruction axis aligned with the flow direction (or flow channel axis). The adjustable obstruction may be greater than 3 cm in length (e.g. along the axis of flow and/or flow channel). The adjustable obstruction may be greater than 5 cm in length. The adjustable obstruction may be less than 10 cm in length. The adjustable obstruction may be less than 30 cm in length. The adjustable obstruction may be greater than 1 cm in width. The adjustable obstruction may be less than 5 cm in width. The adjustable obstruction may be greater than 1 cm in height. The adjustable obstruction may be less than 5 cm in height.

The thermal mass flow meter may comprise a thermal dispersion flow meter or a MEMS chip flow meter. The MEMS chip may be considered to be a form of thermal dispersion flow meter, though not a traditional (non-chip) thermal dispersion type.

According to a further aspect of the present disclosure, there is provided a method for determining the flow rate of gas, the method comprising:
flowing the gas through a channel, the gas channel having a portion with a modifiable cross-sectional area;
measuring the mass flow rate through the modifiable portion by heating a portion of the flowing fluid and then recording how that heat is distributed or dispersed by the flow;
adjusting the cross-sectional area of the modifiable portion based on the measured mass flow rate; and
re-measuring the mass flow rate through the modifiable portion after the adjustment.

The gas meter may be configured to premeasure the flow rate at different cross-sectional area according to a predetermined program. The flow rate determined by the gas meter may be based on the determined mass flow rates at different cross-sectional areas.

According to a further aspect of the present disclosure, there is provided a gas meter comprising:
a flow meter configured to measure a flow of gas to provide a raw gas flow measurement;
at least one gas property sensor configured to determine one or more properties of the gas and of the environment;
wherein the gas meter is configured to provide a compensated gas flow measurement by adjusting the raw gas flow measurement based on the determined one or more properties of the gas and of the environment.

The one or more determined properties of the gas comprise one or more of: the flowing temperature of the gas; the flowing pressure of the gas; the temperature of the atmosphere; the pressure of the atmosphere; and the composition of the gas.

A gas property sensor may comprise one or more of an IR spectrometer; a temperature sensor; and a pressure sensor. A gas property sensor may comprise a photoionization sensor, an infrared point sensor, an infrared imaging sensor, a semiconductor sensor, a laser spectrometer (e.g. a quantum cascade laser spectrometer) and/or a mass spectrometer. A spectrometer may comprise a laser (or other emitter) configured to emit light (e.g. infrared) at a wavelength corresponding to absorption bands of particular compounds (e.g. methane or carbon dioxide) or classes of compounds (e.g. hydrocarbons). The quantum cascade laser may be configured by adjusting the lasing band gap by changing the thickness of the thin layers making up the quantum cascade laser. The IR spectrometer may comprise a Fourier-Transform near or mid IR interferometer (e.g. commercially available options include those produced by ARCoptix™).

A gas property sensor may comprise an IR spectrometer configured to determine the concentration of methane within the gas.

A gas property sensor may comprise an IR spectrometer configured to determine the concentration of hydrocarbons within the gas. It will be appreciated that the IR spectrometer may be configured to detect non-hydrocarbon gases. The gas property sensor may be configured to detect CO, $CO_2$, and/or other non-hydrocarbon gases like $H_2S$, $SO_2$.

The IR detector may comprise multiple detection elements such as a linear pyroelectric array (e.g. a 128 pin array). Other embodiments may use arrays of different sizes (e.g. 256, 512 or more pyroelectric elements). The multiple detection elements may be configured to measure different regions of the spectrum (e.g. different wavelengths by having one or more filters mounted in front of the detection elements).

A variety of algorithms may be used to process the data to determine the spectral signature of the gas compounds and to determine concentrations. Algorithms which may be used include one or more of: Least Square Regression; Classical Least Squares; Inverse Least Squares; Principle Component Regression.

The gas meter may be configured to measure the flow at a multiple different cross-sectional areas (corresponding to different hydraulic diameters) and provide a reading based on the multiple measurements. The gas meter may be configured to adjust for the resistance to flow induced by the modifiable channel portion based on the multiple measurements at different cross-sectional areas. That is, the gas meter may be configured to determine an estimate of the resistance of the modifiable channel portion based on the multiple measurements and take the estimated resistance into account when reporting flow rates.

The gas meter may comprise a flow channel and a separate gas property channel (e.g. arranged in parallel), wherein the gas meter is configured to determine:
  the flow rate from gas flow directed through the flow channel, and
  at least one gas property from gas flow directed through the gas property channel.

The flow channel may be arranged in series with the flow channel. E.g. the gas property sensors and the flow rate sensor may be arranged in a single channel.

At least one of the flow channel and the pressure channel may comprise a filter configured to remove particles and/or water droplets from the flow.

The gas property channel may comprise a vacuum unit for clearing (or purging) the gas property channel prior to determining the composition of the gas.

The gas meter may be configured to make repeated determinations of at least one of the gas properties until the determinations are consistent The modifiable channel portion may comprise multiple sub-channels in parallel or in series, and wherein the total cross-sectional area of the channel can be controlled by selectively obstructing one or more of the sub-channels.

Each sub-channel may have a different cross-sectional area. Each sub-channel may be configured such that it is either open or closed (i.e. such that partial flow through the channel is not available). This may allow the effective cross-sectional area of the modifiable channel portion to take on one of a set of discrete values. In other embodiments, one channel may be modifiable and another channel may have a fixed predetermined cross-section. The fixed channel may be the smallest channel (this may allow the smallest channel for lowest flow to be more reproducible).

There may be a thermal mass flow meter positioned in each sub-channel.

According to a further aspect of the present disclosure, there is provided a method for determining the flow rate of gas, the method comprising:
  measuring a flow of gas to provide a raw gas flow measurement;
  determining one or more properties of the gas and of the environment;
  providing a compensated gas flow measurement by adjusting the raw gas flow measurement based on the determined one or more properties of the gas and of the environment.

According to a further aspect of the present disclosure, there is provided a gas meter comprising:
  a pressure module, the pressure module having a sealable pressure channel configured to enable fluid connection with a gas source and a pressure sensor configured to determine the pressure within the sealable pressure channel when sealed; and
  a flow module, the flow module having:
    a flow channel releasably connectable to pressure module to enable fluid communication between the gas source and the flow channel via the pressure module; and
    a flow sensor configured to determine the flow within the flow channel.

When the flow module is connected to the pressure module, the flow channel may be configured to connect to the pressure flow channel.

The flow module may comprise a gas property channel and a property sensor configured to determine one or more properties of the gas.

The one or more determined properties of the gas and of the environment may comprise one or more of: the temperature of the gas; and the composition of the gas.

According to a further aspect of the present disclosure, there is provided a pressure module, the pressure module comprising:
  a sealable pressure channel with source connector configured to enable fluid connection with a gas source;
  a pressure sensor configured to determine the pressure within the sealable pressure channel when sealed; and
  a module connector configured to enable connection with a further gas module.

According to a further aspect of the present disclosure, there is provided a pressure module, the pressure module comprising:
  a sealable pressure channel with source connector configured to enable fluid connection with a gas source; and
  a pressure sensor configured to determine the pressure within the sealable pressure channel when sealed.

Disclosed herein is a portable, hand-held device to quantify, qualify and identify venting fugitive gas emissions from Surface Casing Vent Flows (SCVF) from oil and gas wells. It may provide a more accurate flow rate while measuring temperatures and pressures for atmospheric air and emission gases. It may also provide the shut-in well pressure from a detachable component. Data may be electronically transmitted to a Cloud/Web based network for reporting, real-time accessing, monitoring and archiving as required by industry. It may include GPS positioning and time/date stamping for authenticating. The gas meter may be an industrial gas meter. The gas meter may be portable.

The gas meter may comprise a variable thermal mass flow sensor. The gas meter may use of optical and/or photosensitive technology to determine the constituents of the gas stream and correct for errors the flow rate. This correction may be performed using algorithms (e.g. in the form of computer program code).

The flow measurement technology may use a MEMs chip with RTD (resistance temperature detector) sensors (e.g. on a glass substrate). An example chip may include the MSF02 package manufactured by Innovative Sensor Technologies™ (IST) as. The chip has the RTDs sensor elements arranged so that is can be used in a calorimeter mode and/or in an anemometer mode.

The gas meter may comprise multiple thermal mass flow sensors, each mass flow sensor configured to measure a different flow rate range. For example, some embodiments may comprise multiple flow channels of varying diameter (e.g. with overlapping turndown ratios). The multiple flow channels may be arranged in parallel. The multiple flow channels may be selectively closed and opened.

The algorithm may be configured to divert the flow through the largest channel first, and try and get a reading. If that couldn't get an accurate reading, the gas flow may be diverted to the next largest channel and so on, until the flow rate was able to be measured accurately. The sensors may all use the same type of MEMS chip.

The gas meter may be configured to measure gas flows as low as 0.04 ml/min. The gas meter may be configured to measure flow up to three hundred cubic meters per day (210,000 ml/min). This range represents a turndown ratio of approximately five-million to one (other embodiments may have a turndown ratio of up to 20 million to one). Turndown ratios may be achieved by adjusting the cross-sectional area of the channel. The flow area may be variable from 0.2 mm² to 135 mm² by, for example, raising or lowering a plunger over the chip or changing between flow modules with different predetermined cross-sectional areas. The modules may be configured to be changed without dismantling the gas meter.

The gas meter may comprise an outlet connector to connect to a gas sample container (e.g. a sealable tedlar bag or gas sample bottles (GSB)). This may allow a portion of the gas to be stored and removed for further analysis (e.g. at a remote gas analytics laboratory).

The device or system may comprise processing circuitry and/or a controller to calculate, assess and/or determine the gas parameters based on sensor data. The processing circuitry may include memory (for example, Flash memory, DRAM and/or SRAM) to store, and transmitter circuitry to send and receive information over the cellular, GSM, SCADA, satellite or other such communication network, said sensor data and information which is representative of gas parameter (for example, methane concentration). The device, machine(s), processor(s) (suitably programmed) and/or field programmable gateways (or combinations of the aforementioned)) may be employed to calculate, assess and/or determine the gas flow and/or gas parameters based on sensor readings from the gas meter. The data may be transmitted be "real time" such that the data can be viewed or monitored remotely.

A controller may comprise a processor (e.g. a central processing unit, a microprocessor, an application-specific integrated circuit or ASIC or a multicore processor). The controller may comprise memory (e.g. flash memory, a harddrive, volatile memory). The controller may be configured to run computer program code (e.g. stored on the memory) configured to allow a controller to adjust the configuration of the gas meter based on sensor readings (e.g. controlling the cross-sectional area of the flow channel based on the sensed composition of the gas). The computer program code may be stored on a non-transitory medium such as a CD or DVD.

BRIEF DESCRIPTION OF THE DRAWINGS

Various objects, features and advantages of the invention will be apparent from the following description of particular embodiments of the invention, as illustrated in the accompanying drawings. The drawings are not necessarily to scale, emphasis instead being placed upon illustrating the principles of various embodiments of the invention. Similar reference numerals indicate similar components.

FIG. 2c is a schematic diagram of the components of the gas meter of FIG. 1a.

FIG. 3b is an engineering drawing cross-section the embodiment of FIG. 3a;

FIG. 6b is a perspective cross-section view of the embodiment of FIG. 6a.

FIG. 6i is an overhead view of the embodiment of FIG. 6a.

FIGS. 7b and c are perspective views of an embodiment which comprises one of the plungers of FIG. 7a.

DETAILED DESCRIPTION

Introduction

Figure 1A:
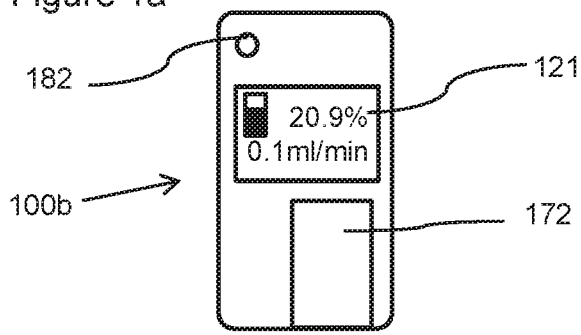
FIGS. 1a-1c are front views of a first embodiment of a modular gas meter.

The inventors have realized that there is a need for a better gas meter. In particular, an improved gas meter may be easier to use and/or be more accurate in measuring flow rates (e.g. particularly at low and ultra-low flow-rates). In addition the present invention may help provide the user with real-time data feedback, as opposed to the slow turn-around of current methods In particular, the inventors have recognized that it may be advantageous to accurately measure very low flows (e.g. as low as or lower than 0.04 ml/min), particularly from source fugitive gas emissions. This is particularly important within the field of oil and gas venting systems, well abandonments and, more specifically, to the measurement and remediation of surface casing vent flows (SCVF), which may primarily consist of methane emissions. It will be appreciated that the technology described herein may be applied to areas outside of oil and gas well abandonments.

Embodiments disclosed herein are designed as fugitive gas emission detection/monitoring device and software systems initially conceived for monitoring and remediating oil and gas well vent flows. The device may incorporate smart metering technology coupled with intuitive software and real time, remote monitoring capabilities. Embodiments may include one or more of the following features:

1. It will confirm if there is hydrocarbon gas present and emanating from the vent. It may also be able to distinguish between thermogenic- and biogenic-origin gases by, for example, measuring and comparing the methane ($CH_4$) content of the gas stream to that of the sum of ethane+($\Sigma C_2H_6$+) in ppm. Ethane+ corresponds to hydrocarbon compounds heavier than methane (e.g., ethane, propane, butane etc.). For example, an algorithm derived from a logarithmic plot of $\Sigma C_2H_6$+ versus $CH_4$ can determine the nature of each type of gas' origin relative to the quadrant of the graph that the relative characterization co-ordinates are plotted. Essentially the determination may be based on how "dry" the gas is ("dry" being associated with methane gas). If "wet gases ($C_2$+) are present, the gas is thermogenic in origin. If the gas is "dry" (i.e., only methane) then there is a possibility that the gas may biogenic in origin and further gas analysis may be required.
2. The device will be configured to analyze the gas stream and reveal the molecular components, concentration of each and the speciation of gases through spectral analysis. This information can be cross-referenced in a database for "fingerprint" correlation to assist in the determination of thermogenic gas source rock/formation for well monitoring and integrity restoration. Alternatively or in addition, the device may be configured to associate certain peaks in the spectrum or the response over a narrow wavelength range with a particular compound (e.g. methane) or class of compound (e.g. hydrocarbons).
3. The device will be configured to provide an accurate measurement of the gas flow rate for quantitative, qualitative and regulatory purposes.
4. The device will electronically monitor, record and display the shut-in pressure and build-up pressure profile of the SCVF for regulatory requirements and well integrity safeguarding.
5. The device will electronically monitor, record and display the atmospheric pressure, ambient temperature, the temperature, pressure, and flow rate of the emission stream, for regulatory requirements and to assist in the diagnosis for well monitoring and restoration.
6. A GPS or equivalent function will provide exact location for regulatory compliance and data authentication and all data will be date and time stamped.
7. The device will be highly portable, rugged for year round outdoor use, and intrinsically safe, while providing a simple plug and play system.

There are several use scenarios for the invention:

A portable unit to be used for the immediate real time detection and ongoing well inspection of fugitive emissions during regulated well check routines;

A more sophisticated unit, incorporating full spectral analysis to the portable unit for continuous remedial monitoring while providing real time data and results;

A "sentinel" unit, incorporating components of the portable unit with and an extended-life power source (e.g. larger battery, mains power or renewable energy source), to be used for continuous monitoring and testing for intermittent gas emission venting identification or permanent vent flow monitoring.

In all three scenarios the invention will provide the necessary telemetry system to automatically upload data to a web-based data network. An onsite operator's computer, smartphone or tablet device will be able to observe live information or offsite personnel will have the ability to log into the web-based data network and receive live or real time information as it is transmitted from the device.

In addition, there may be devices with various levels of complexity. For example, one flow-meter unit may be fully automated; another may be manually configurable (e.g. between two, three or more configurations); and another may be configurable by replacing a module which adjusts the cross-sectional area of the flow channel.

All terms have definitions that are reasonably inferable from the drawings and description.

Various aspects of the invention will now be described with reference to the figures. For the purposes of illustration, components depicted in the figures are not necessarily drawn to scale. Instead, emphasis is placed on highlighting the various contributions of the components to the functionality of various aspects of the invention. A number of possible alternative features are introduced during the course of this description. It is to be understood that, according to the knowledge and judgment of persons skilled in the art, such alternative features may be substituted in various combinations to arrive at different embodiments of the present invention.

Portable Unit

Figure 1B:
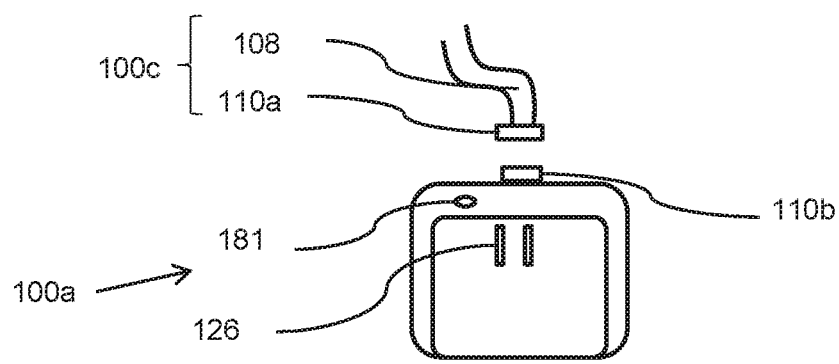
Figure 1C:
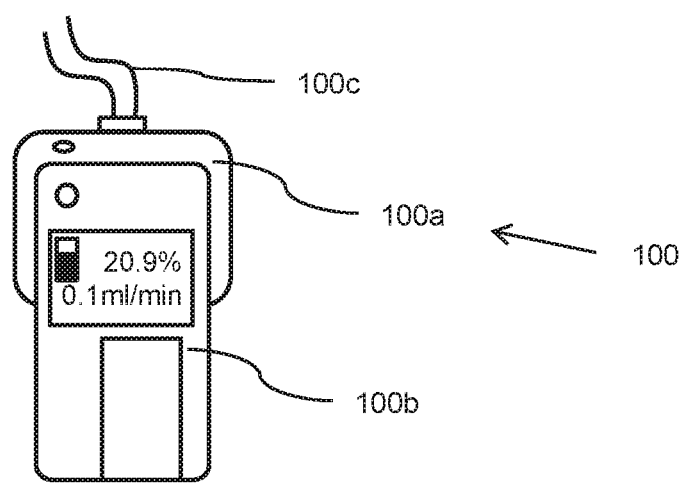
Figure 1D:
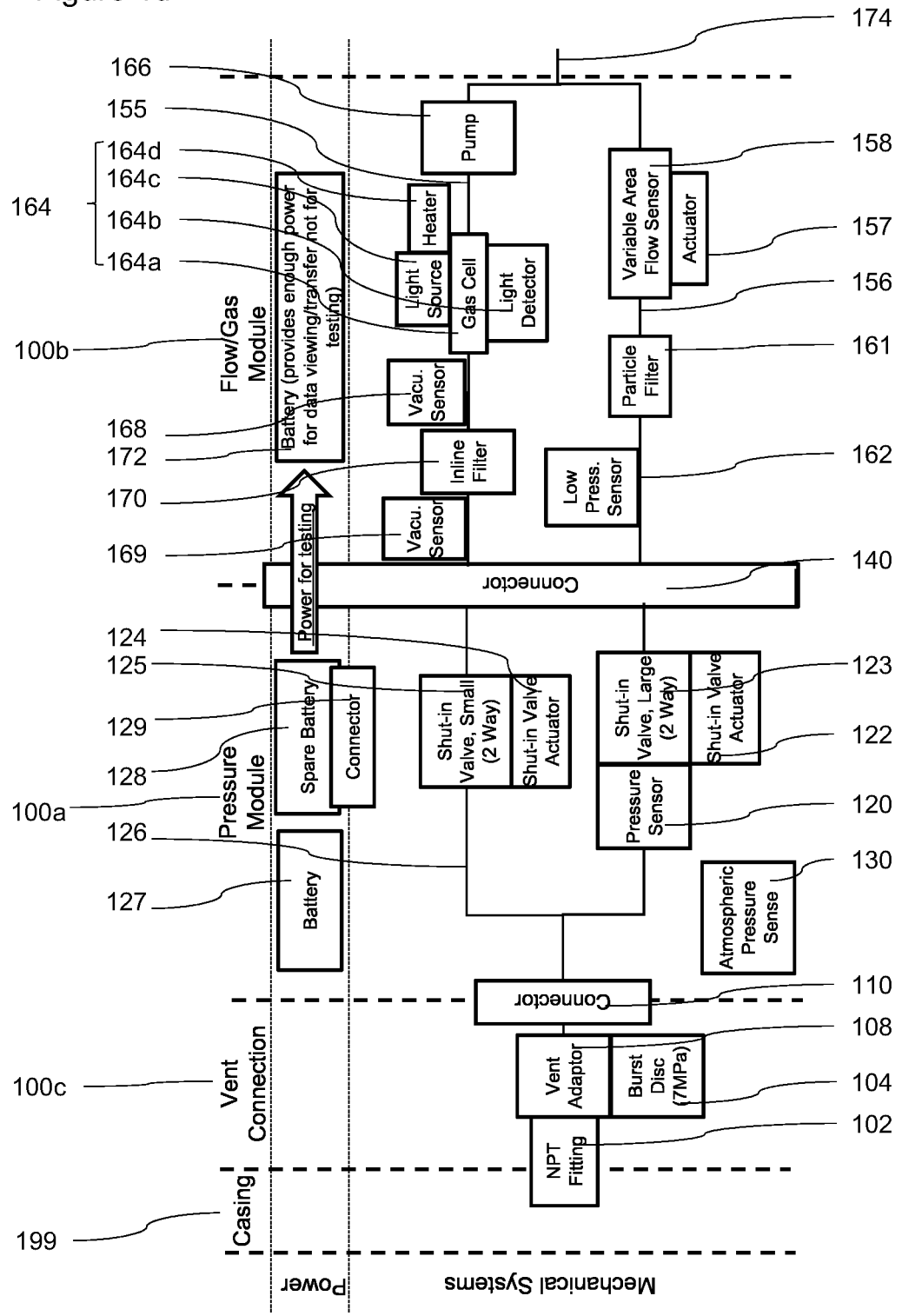
FIG. 1d is a schematic block-diagram of the components of the gas meter of FIG. 1c.

FIGS. 1a-c show a first embodiment 100 of a portable gas meter unit configured to be temporarily connected to a vent. FIG. 1d shows a schematic diagram of the various components of the portable unit shown in FIGS. 1a-c. In this case, the embodiment gas meter unit comprises:

a channel 156 comprising a adjustable (and modifiable) channel portion 158 with an adjustable and modifiable cross-sectional area; and a thermal mass flow meter positioned within the adjustable (and modifiable) channel and which measures the mass flow rate by heating a portion of the flowing fluid and then recording how that heat is dispersed by the flow, wherein the gas meter is configured to control the cross-sectional area of the adjustable (and modifiable) channel based on the measured mass flow rate.

This embodiment 100 is a handheld unit and is configured to be used for routine well testing. In this case, the handheld unit will measure flow, stabilized vent shut-in pressure, and determine alkane hydrocarbon presence/absence by measuring methane concentration by infrared spectroscopy.

In this case, the embodiment comprises three components:

1) a pressure module 100a (shown in FIG. 1b), a pressure module comprising a sealable pressure channel 126 and a pressure sensor 120 configured to determine the pressure within the sealable pressure channel (e.g. when it is sealed);

2) a flow module 100b (shown in FIG. 1a), the flow module being detachable from the pressure module and comprising a flow channel and a flow sensor 158 configured to determine the flow rate within the flow channel 156 (as shown in FIG. 1d); and 3) a pressure hose 100c (shown in FIG. 1c), the pressure hose 100c being configured to be releasably connectable to the pressure module 100a and to the gas source (e.g. to a vent).

FIG. 1c shows the handheld or portable gas meter 100 in the assembled configuration, where the pressure module 100a is connected to the flow module 100b by connector 140; and the pressure hose 100c is connected to the pressure module 100a by connector 110 (e.g. male 100b and female 100a quick connector).

In this case, the handheld gas meter 100 is configured to hook up (quick connect) to the vent via a flexible pressure hose 108. It will be appreciated that the pressure module may be connected to the vent in other ways in other embodiments. As shown in FIG. 1d, in this case, the vent connector comprises the flexible hose vent adaptor 108 with a burst disc 104 which is a non-reclosing pressure relief device that helps protects the system from over- or under-pressurization. In this case, the burst disc is configured to rupture at 7 MPa (this is a regulatory requirement in Alberta). The vent adaptor in this case is configured to connect to the casing 199 using a National Pipe Thread (NPT) fitting 102. It will be appreciated that other fittings may be used as required. Likewise, in other embodiments the burst disc may be configured to rupture at a higher or lower pressure.

In this case, the module connector 140 is provided by the pressure module and the flow module having a complementary shape (and complementary gas channel connectors) to enable the two modules to fit together.

In this case, the first upstream component in the gas meter 100 will be the shut-in pressure module 100a. As noted above, the pressure module 100a is, in this case, configured to be detachable from the flow module 100b. This allows the flow module 100b to be removed (e.g. to allow the shut-in pressure to be determined which may take days or weeks to determine). Because of the time required to perform a shut-in pressure determination, the shut-in pressure may be the last parameter to be measured.

Allowing the flow meter 100b to be detached from the pressure meter may allow the same flow meter to be used with different pressure modules. In some embodiments, each pressure module may be associated with an identifier (e.g. an RFID tag or a data signature transmitted between the modules when connected) such that data from different pressure modules may be distinguished by the flow module. In addition, removing the flow module when it is not needed may reduce the risk of theft.

As shown in FIG. 1d, the pressure module 100a in this case comprises a single inlet to provide fluid communication with the pressure hose 100c. A pressure channel 126 runs from this inlet, splits into two sub-channels to two outlets. As will be discussed later, these sub-channels are used to control the gas flow in the flow module. As shown in FIG. 1d, the pressure module comprises two shut-in valves 123, 125 (one corresponding to each outlet) for sealing the pressure channel such that it is only open at the inlet. In this case, each shut in valve has its own valve actuator 122, 124. In other embodiments, the same actuator may control all outlet shut-in valves. In other embodiments, there may be a single inlet in fluid communication with a single outlet via a single channel.

When the shut-in valves 123, 125 are closed, pressure from the gas source is allowed to build up within the pressure channel 126 where it may be monitored using the pressure sensor 120. In cases where the flow is low, the pressure build up may take some time (e.g. weeks). Some embodiments may be configured to record the build up of pressure and provide an estimate of the shut-in pressure by extrapolating the build up pressure data (e.g. by providing an asymptotic value). In other embodiments, the reported pressure may be when a number of successive pressure readings are within a predetermined consistency. The measured pressure may be reported with respect to atmospheric pressure which may be recorded using a separate atmospheric pressure sensor 130. The atmospheric pressure sensor may be used to correlate of intermittent vent flows with atmospheric pressure, as ambient pressure changes can sometimes alter whether or not a vent flow is present (i.e., low pressure vent flows stop flowing during a high pressure weather system).

In this case, the pressure module 100a comprises a wireless antenna 181 for transmitting data to a remote device (e.g. to the disconnected flow module 100b or to a remote server, personal computer/tablet). Other pressure modules may comprise communication circuitry (e.g. for USB connection, Bluetooth™ and/or GSM connectivity). For example, one of the modules may have wireless and the other communication circuitry (Bluetooth etc.) on the same device. A pressure module may also comprise a user interface (e.g. simple indicator lights to indicate whether the module is or is not recording and/or a display).

When the flow module 100b is connected to the pressure module 100a, and at least one of the shut-in valves 123, 125 are configured to be open, the gas will then flow into the flow module 100b via the open valve or valves. In this embodiment, two channels for the gas run in parallel within the flow module 100b: a gas property channel 155 and a flow channel 156 with a flow meter 158. The gas property channel 155 and flow channel 156 exit the module via outlet 174.

In this case, the gas property channel 155 comprises a gas composition detector 164. In this case, the gas composition detector 164 is an IR detector with an IR source 164c and detector 164b. That is, the portion of the gas property channel between the IR source 164c and detector 164b forms a gas cell 164a. In this case, the IR source 164c and detector 164b are configured to detect the concentration of methane. In particular, the IR detector is configured to detect IR radiation at a frequency of 3.375 µm for C—H bond detector (e.g. for detecting hydrocarbons such as methane) and 3.91 µm for reference measurement. The light source heater 164d is configured to emit light in the IR (blackbody radiator). In other embodiments, the gas property channel may comprise temperature and/or pressure sensors.

The gas property channel, in this case, also comprises an in-line filter positioned before the gas cell 164b. Before and after the inline filter 170, there is positioned a vacuum sensor 168, 169. The purpose of the filter is to remove particles and water that may alter the reading. The vacuum sensors 168, 169 are used to indicate when the filter needs to be replaced (maintenance), for example, by measuring a pressure drop exceeding a predetermined threshold across the filter 170.

In this case, the gas property channel 155 also comprises a vacuum unit. The vacuum unit in this case is a pump 166

(e.g. a negative displacement pump such as a diaphragm pump, or a positive displacement pumps such as a rotary vane pump, or a scroll pump). This allows the flow module 100b to purge the atmospheric gases out of the gas property channel, and pull in vent gas to ensure the optical gas cell 164a is completely filled by the vent gas. This purge cycle will be run or repeated until the composition detector 164 records a set number of tests that show consistent results (e.g. 5 consistent results). A determination of the presence and concentration of methane will then be made, and the methane concentration will be used to correct for any error in the flow rate. In this case, the IR sensors are from Pyreos™ (Part no. PY0261) and the optical cell IR source for both are from Axteris™ (Part no. EMIRS 200 with Reflector 3). It will be appreciated that other IR sources and sensors may be used. In some embodiments, some gas properties may be determined in the pressure and/or flow channels (e.g. temperature).

The raw flow rate determination, in this case, is performed by shutting off flow to the gas property channel 155 and directing all flow from the gas source through the flow channel 156. This can be achieved by shutting off shut-in valve 125 in the pressure module 100a and opening valve 123, Before the gas reaches the flow sensor it passes through a particle filter 161 to remove particles and/or water vapour from the flow. This may increase the accuracy of the reading and/or keep the flow sensor clean.

In this case, there is also a low pressure sensor 162 located in the flow channel 156. The low pressure sensor is used to determine if the flow channel filter requires maintenance or replacing.

The gas channels may be formed from stainless steel. The flow channel path may be approximately ½″ (12.7 mm) in diameter where the channel diameter is fixed, and the gas property channel may be approximately ⅛″ (3.175 mm) in diameter. It will be appreciated that in different embodiments, the channel sizes may be different (e.g. between 1/16″ or ⅛″ and 2″ (1.59 mm, 3.175 mm and 50.8 mm)).

In this case, the flow meter 158 in the flow channel is a thermal mass flow meter. In particular, in this case, the sensor used for the gas flow is a (MEMS) (microelectromechanical systems) constant temperature anemometer chip. For example, such a chip may be Part no. MSF02 from Innovative Sensor Technologies It will be appreciated that other chips may be used, e.g. from a different supplier or custom manufactured. As will be discussed below, the flow through the sensor portion of the channel is controlled by controlling the cross-sectional area of the flow channel 156 using actuator 157.

The thermal mass flow meter is, in this case, configured to measure a range of flows from 0.01 ml/min to 210,000 ml/min (~300 m³/day).

In this case, the apparatus 100 is configured to provide a compensated gas flow measurement by adjusting the raw gas flow measurement based on the determined composition of the gas. For example, the unit may be configured to correlate measured raw flow measurements with different compensated gas flow measurements as a function of the measured concentration of methane (or other gas property).

In this case, the gas meter 100 uses mid-range infrared spectroscopy as well as ambient pressure and temperature readings to compensate for different gas properties. This may improve the accuracy of the gas meter. Other embodiments may use a different frequency range (e.g. near-IR spectroscopy).

The flow module in this case comprise communication circuitry 182 (e.g. for USB connection, Bluetooth™ and/or GSM connectivity) to allow data to be transmitted from the device to a remote electronic device (e.g. a server or cloud) for further processing. The flow module in this case also comprises a user interface 121 (e.g. simple indicator lights to indicate whether the module is or is not recording and/or a display configured to show remaining battery life; percentage concentration of methane and compensated flow rate).

In this embodiment, the data may be uploaded via wireless transmission to the user's smartphone, tablet or computer using a wireless antenna, and/or via a USB port to use a flash drive or cable link. The device may also transmit the gathered data via internet into a central core database for interface by end users.

In this embodiment, as shown in FIG. 1d, the power for the device is primarily from batteries (main battery 127 and possible spare battery 128 connected by battery connector 129) stored in the pressure module 100a. These batteries have terminals which connect to the flow module for powering testing when the pressure module 100a is connected to flow module 100b (e.g. as shown in FIG. 1c). This reduces the weight of the flow module 100b and increases flexibility for the pressure module 100a which may be left in situ for days or weeks to perform shut-in pressure measurements. In this case, the flow module also includes an onboard battery 172 for data viewing; data transfer and/or testing. It will be appreciated that other embodiments may use renewable power sources such a solar power.

Broad-Spectrum Unit

Figure 2A:
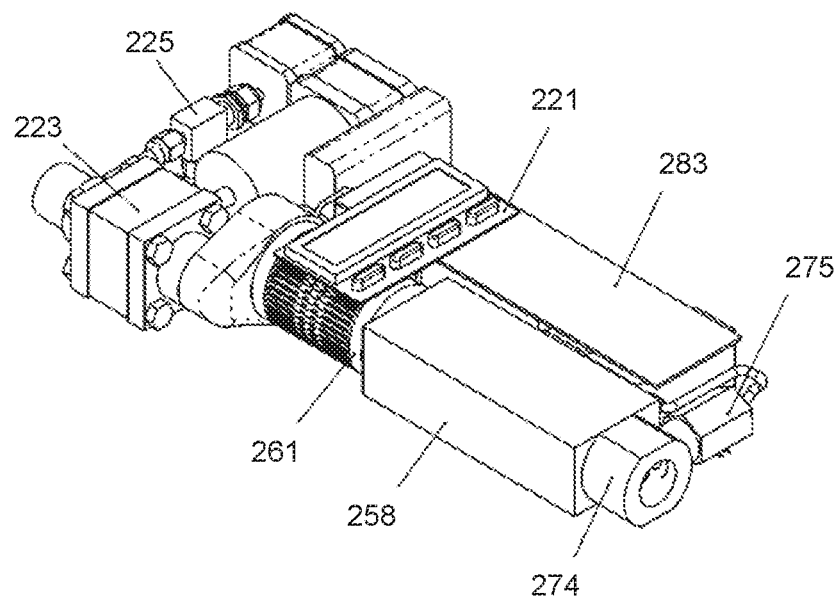
FIGS. 2a-2b are respective top and bottom perspective views of a further embodiment of a gas meter.
Figure 2B:
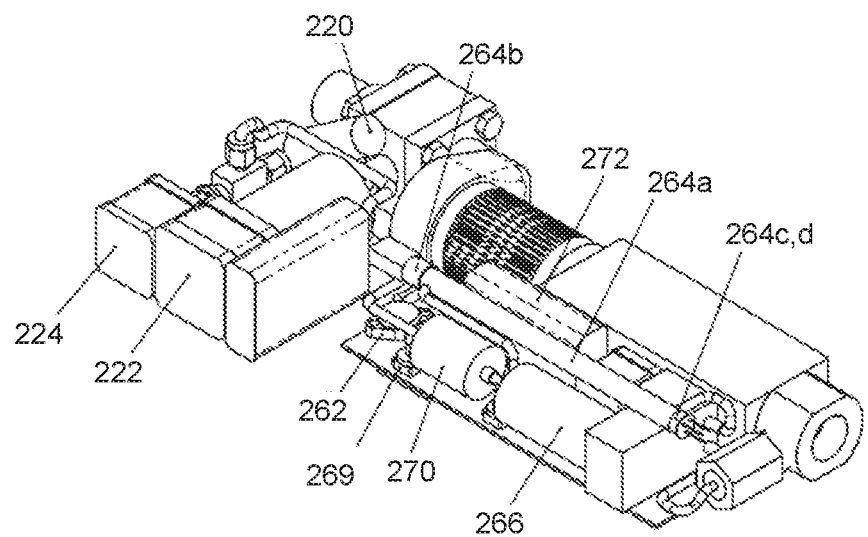
Figure 2C:
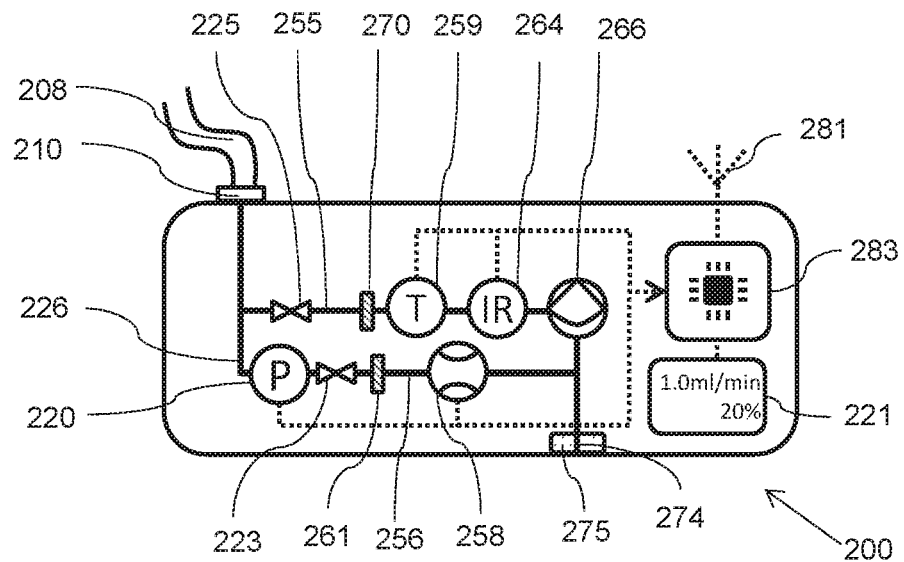

FIGS. 2a-c shows a further embodiment which is a broad-spectrum unit 200. The broad-spectrum unit is largely similar to the portable unit of FIG. 1c. However it may be used more specifically for venting well diagnosis, remedial repairs, and post-remedial monitoring. As with the embodiment of FIG. 1a, this embodiment 200 comprises an isolatable pressure channel 226 with pressure sensor 220 for determining the shut-in pressure. The pressure channel 226 may be isolated by actuating the shut-in valves 223 and 225. The pressure channel is configured to receive gas from a gas source from a vent adaptor 208 connected to the device by connector 210.

The gas meter in this case is at least partially powered by battery 272. To give an indication of size, the length of the meter shown in FIG. 2a may be around 50 cm.

This embodiment also has a flow channel 256 with thermal mass flow meter 258 for determining the flow rate and a gas property channel 255 for determining properties of the gas (e.g. temperature and composition). The gas property channel and flow channel exit the gas meter via outlet 274 which in this case comprises a flame arrestor 275.

In this case, the gas property channel comprises a temperature sensor 259 and a composition detector 264 (in this case an IR spectrometer). In this case, the gas property channel also has a pump 266 to clear the gas property channel prior to determining one or more of the gas properties, and a inline filter 270 for removing particulates and/or water droplets from the flow prior to the gas property sensors 259, 264. The inline filter 270 is positioned between two vacuum sensors (one of which 269 can be seen in FIG. 2b). The vacuum sensors are used to indicate when the filter needs to be replaced (or have maintenance), for example, by measuring a pressure drop exceeding a predetermined threshold across the filter 270.

Like the previous embodiment, the IR spectrometer composition sensor comprises an IR light source 264c, 264d, a gas cell 264a (formed in flow channel 256) and an IR detector 264b. Whether gas is directed to the flow channel 256 or to the gas property channel 255 is controlled by valves 223, 225 (which in turn are controlled by respective actuators 222, 224).

The flow channel 256 also comprises a filter 261 for removing particles and water droplets from the gas flow before it reaches the flow sensor 258. In this case, there is also a low pressure 262 sensor located in the flow channel 256. The low pressure sensor is used to determine if the flow channel filter requires maintenance or replacing.

It will be appreciated that other embodiments may use a diverting valve. A diverting valve may allow gas flow to be directed between the flow and gas property channels successively (e.g. through the gas property channel only for determining composition; and then through the flow channel only for determining the flow rate). For example, the pressure channel may be a single channel terminating after the pressure sensor with a diverting valve, the diverting valve outlets being the start of the flow and gas property channels. In this case, the diverting valve could be turned off to facilitate pressure measurements. In other cases, the pressure channel may be isolated by a single in-line valve.

In this case the gas channels 226, 255, 256 are shown in solid lines and the data links are shown in dotted lines. As shown in FIG. 2c, data is transmitted from each of the sensors 220, 259, 264, 258 to a controller 283. The controller 283 may then transmit the data to a remote device by, for example, a wireless antenna 281; and/or display data to the user via display 221.

In this case, the optical cell composition detector 264 for determining the composition of the gas is more sophisticated than that of FIG. 1d and the advanced infrared spectroscopy will give more complete determination of the compounds present by detecting over a broader IR spectra. In this case, the light source is a broadband source and emits blackbody radiation in the characteristic curve, so data may be obtained for the whole blackbody emission range. In this embodiment, the data used is in the 2.5 µm to 5 µm range. The linear array detector may have filters on it that blocks out the other wavelengths, thereby only recording the desired specific range.

Other embodiments may use other spectral ranges including the near-IR range (0.7-2.5 µm) and/or far-IR range (5 µm-1 mm) to detect gases. Other embodiments may use a photoionization sensor, an infrared point sensor, an infrared imaging sensor, a semiconductor sensor, a laser spectrometer (e.g. a quantum cascade laser spectrometer).

In this case, the IR spectrometer is configured to determine the relative concentrations of the hydrocarbon gas and associated gas component mixture emanating from the subject well (or other gas source). In this case, the IR sensors are from Pyreos™ (Part no. PY1499). It will be appreciated that other IR sensors may be used.

The IR detector may comprise multiple detection elements such as a linear pyroelectric array (e.g. a 128 pin array). Other embodiments may use arrays of different sizes (e.g. 256, 512 or more pyroelectric elements).

A variety of algorithms may be used to process the data to determine the spectral signature of the gas compounds and to determine concentrations. Algorithms which may be used include one or more of: Least Square Regression; Classical Least Squares; Inverse Least Squares; Principle Component Regression.

In this embodiment, the processing is done using a Partial Least Squares algorithm. Its purpose is to resolve the spectral curves from the data the array collects (128 pins=128 points of data along the observed spectral range, 256 pins=256 data points, etc.). Advantages of Partial Least Squares may include:

- Combines the full spectral coverage of CLS (Classical Least Squares) with the partial composition regression of ILS (Inverse Least Squares).
- Single-Step decomposition and regression; eigenvectors are directly related to constituents of interest rather than larger common spectral variations.
- Calibrations are generally more robust provided that calibration set accurately reflects range of variability expected in unknown samples.
- Can be used for very complex mixtures because only knowledge of constituents of interest is required.
- Can sometimes be used to predict samples with constituents (contaminates) not present in the original calibration mixtures (this is important in oil and gas situations where the gas source being measured may not be well characterized).

Another preferred algorithm is based on Principle Component Regression (PCR). PCR constructs a set of spectra from the training samples and uses regression to determine the concentration of each spectrum that is present in the sample. This method however creates the spectra from the training samples using Principle Component Analysis (PCA). These spectra are not related to the components of interest but are rather the major variations between the training samples. This makes determining the component concentration a two-step process: first the weighting of the spectra are determined that creates a best fit to the sample data, and then these weightings are used to find the concentrations from the training data. Advantages of PCR may include:

- Does not require wavelength selection; any number can be used, usually the whole spectrum of large regions.
- Larger number of wavelengths gives averaging effect, making model less susceptible to spectral noise.
- PCA data compression allows using inverse regression to calculate model coefficients: can calibrate only for constituents of interest.
- Can be used for very complex mixtures because only knowledge of constituents of interest is required.
- Can sometimes be used to predict samples with constituents (contaminates) not present in the original calibration mixtures (this is important in oil and gas situations where the gas source being measured may not be well characterized).

This device is configured to transmit the data it gathers in real time wirelessly to a smartphone, tablet or laptop onsite. There may be a USB port to use a flash drive or cable link. The device will also transmit the gathered data, real-time via internet into a central core database for interface by its customers.

The broad-spectrum device can be configured to function as a "sentinel" meter, logging data unattended and utilizing an external power station and uplink module. The external power station may comprise a mains supply and/or one or more renewable energy sources. In "sentinel" mode, the meter will be able to be accessed remotely to check up on the data it provides and evaluate well conditions without having to be onsite.

It will be appreciated that the broad-spectrum unit may also be modular, with separate pressure and flow (and optionally power) modules. That is, the pressure, flow and/

Variable Thermal Mass Flow Sensor- Adjustable Obstruction

Figure 3A:
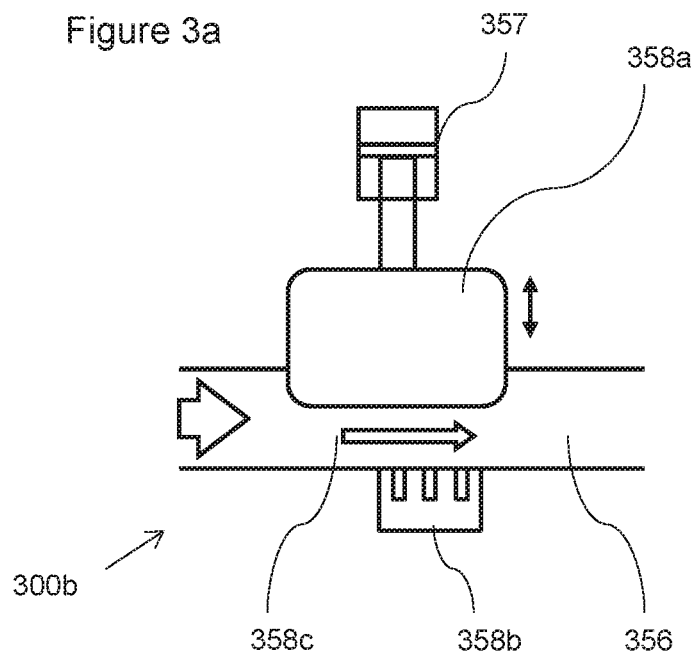
FIG. 3a is a schematic side view of a variable thermal mass flow meter with an adjustable obstruction.
Figure 3B:
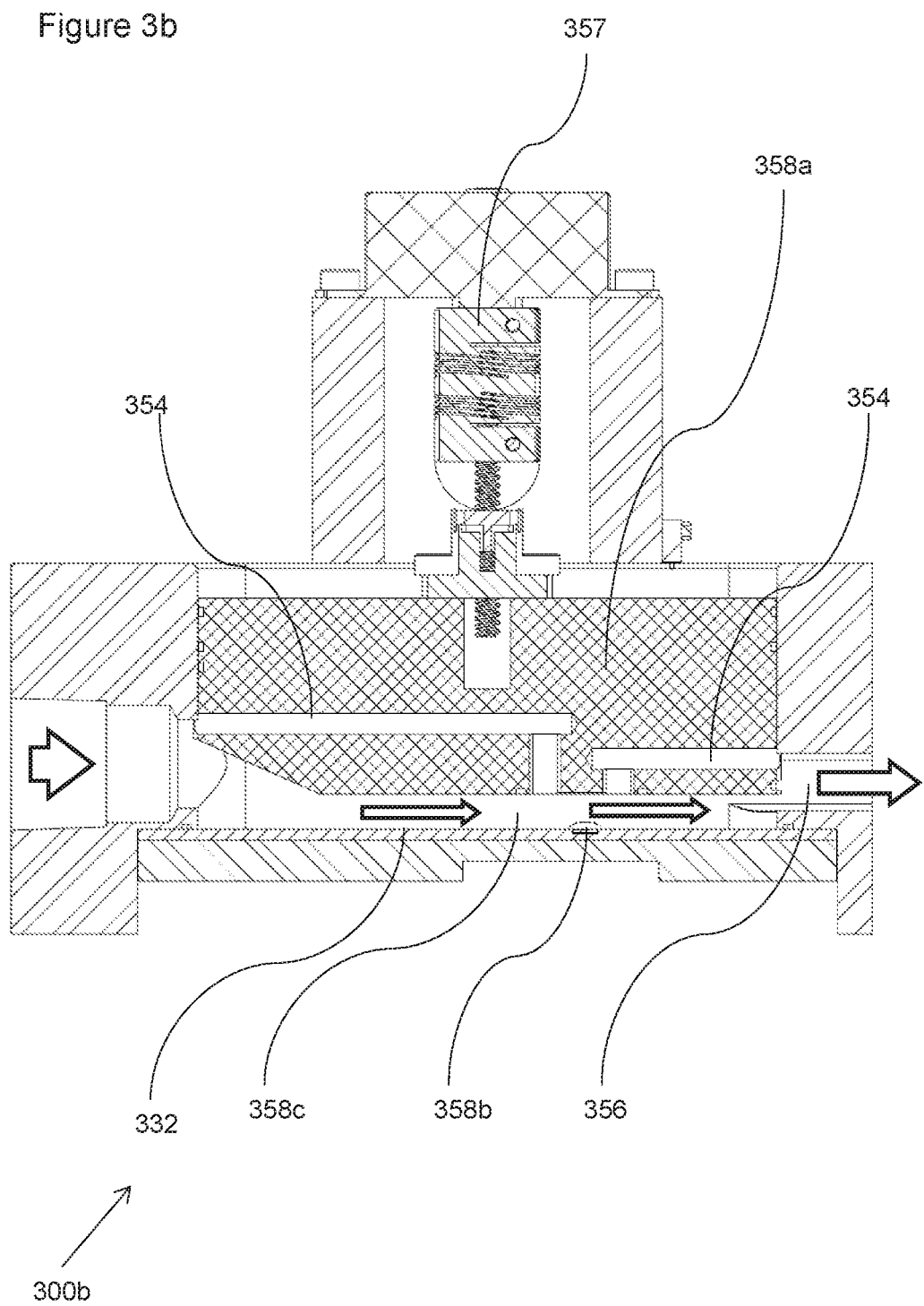

FIGS. 3a and 3b show a variable mass flow sensor (e.g. 158 or 258) in more detail. Such a variable thermal mass flow sensor may form part of, for example, a portable or a broad-spectrum unit.

In this case, the variable mass flow sensor comprises:
a channel 356 comprising an adjustable and modifiable portion 358c with an adjustable and modifiable cross-sectional area; and
a thermal mass flow meter 358b positioned within the adjustable and modifiable channel portion 358c and which measures the mass flow rate by heating a portion of the flowing fluid and then recording how that heat is dispersed by the flow,
wherein the gas meter 300 is configured to control the cross-sectional area of the adjustable and modifiable channel based on the gas flow rate.

In this case, the modifiable channel comprises an adjustable obstruction 358a which can be moved within the modifiable channel portion 358b to change the cross-sectional area of a modifiable channel portion. In this case, the adjustable obstruction is continuously adjustable to provide any arbitrary cross-sectional areas within the range of motion of the adjustable obstruction. It will be appreciated that the adjustable obstruction may be configured to be positionable in a number (2, 3 or more) of discrete positions. For example, the motor driving the adjustable obstruction may be a stepper motor. The system may be configured to measure the position of the adjustable obstruction.

The adjustable obstruction in this case is around 7-8 cm in length, around 2-4 cm in height and around 2-4 cm wide.

It will be appreciated that reducing the cross sectional area of the channel will increase the velocity of the gas for a given flow rate. The adjustable obstruction in this case comprises a plunger or piston, which is raised or lowered by an actuator 357 (e.g. a motor moving a screw thread). In this case, the adjustable obstruction 358 a is adjusted based on the measured flow rate to increase accuracy. In some embodiments, the adjustable obstruction is streamlined (e.g. tapered) to promote laminar flow across the flow meter. That is, the upstream edges of the obstruction may be tapered to help reduce resistance and streamline the gas flow.

In this case, as shown in FIG. 3b, the plunger 358 is configured to provide alternative flow paths depending on the position of the plunger. That is, in addition to adjusting the cross-sectional area of the flow path by moving the plunger up and down, the plunger 358 in this case is configured to be positionable in contact with the flow sensor-supporting surface 332. In this configuration, gas flow is not permitted below the plunger but an alternative flow path 354 is provided through the plunger 358a. This may help allow the configuration with the smallest cross-sectional area to be more reproducible as it will be based on the plunger being in contact with the flow sensor-supporting surface 332.

The alternative flow path 354 in the plunger in this case comprises an inlet closed channel portion, an open channel (sensor) portion and an outlet closed channel portion. The open sensor portion of the channel is configured to be enclosed by the sensor supporting surface 332 and the sensor when the plunger is fully down thereby creating a fully closed channel alternative flow path 354 when the plunger is in this configuration.

It will be appreciated that, in other embodiments the adjustable obstruction or plunger may not have an alternative flow path within the adjustable obstruction or plunger. In other embodiments, the smallest cross-section configuration may be provided by having just an open channel on the bottom of the adjustable obstruction or plunger, which is enclosed by the sensor supporting surface when the plunger is fully down. The adjustable obstruction may be configured to open or close the alternative flow path depending on, for example, the position of the adjustable obstruction.

In this case, the unit will start a flow measurement in a fully opened configuration (largest flow channel). This will establish a baseline flow measurement. If no flow is detected, the channel will be closed in steps. During each step, the flow will be checked until the flow is in range.

To provide the ability to measure low flow rates (e.g. as low as or lower than 0.01 ml/min), the modifiable channel is configured to have a minimum cross section of between 1 and 5 mm$^2$ In this case, the gas meter is configured to control the cross-sectional area of the modifiable channel based on the gas flow rate such that at high flow rate the cross-sectional area of the modifiable channel is larger than at low flow rate. This means that the thermal mass flow meter can measure within a restricted velocity range for a wide range of flow rates. This may increase the accuracy and/or the dynamic range of the device. It will be appreciated that using an adjustable obstruction may allow the cross-sectional area to be modified as a continuous variable.

Variable Thermal Mass Flow Sensor - Sub-Channels

Figure 4A:
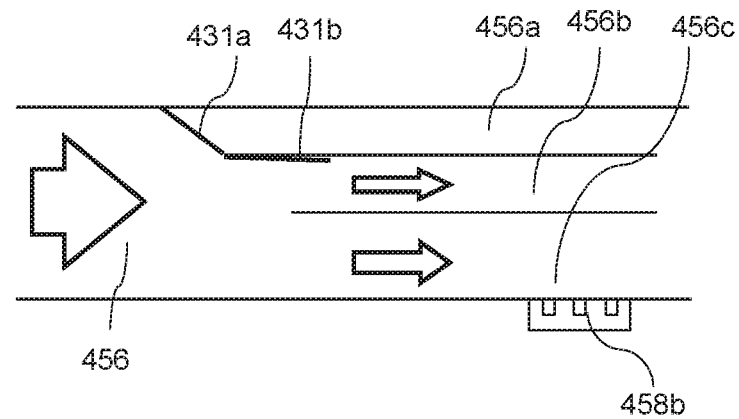
FIGS. 4a-4b are schematic views of a variable thermal mass flow meter with multiple sub-channels.
Figure 4B:
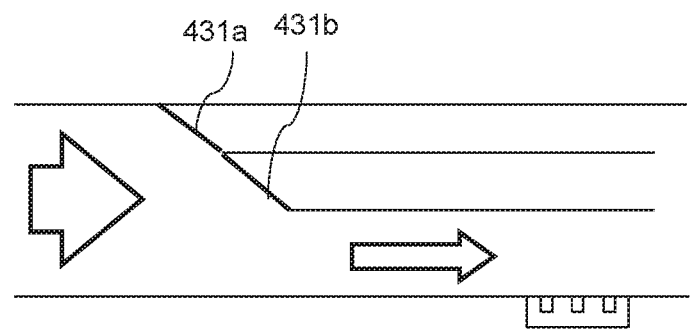

FIGS. 4a and 4b show an alternative way of adjusting the cross-sectional area of a portion of the flow channel 456. In this case, the modifiable channel portion comprises multiple sub-channels 456a, 456b, 456c in parallel, and wherein the total cross-sectional area of the channel can be controlled by selectively obstructing one or more of the sub-channels. In this case, the sub-channels can be obstructed by closing valves 431a, 431b over one or more of the sub-channels. Closing the valves reduces the cross-sectional area of the modifiable portion of the flow channel.

The third channel 431c, in this case, is never occluded in this embodiment because the thermal mass flow meter 458b is located in the third channel. In FIG. 4a, the first sub-channel 456a is occluded which directs the flow through the second 456b and third 456c flow sub-channels.

In FIG. 4b, the first 456a and second 456b flow channels are occluded which directs the flow through the third flow sub-channel only. As shown in the figures, the valves in this embodiment are configured when closed to direct flow smoothly to the remaining open sub-channels so as not to restrict flow.

Figure 5A:
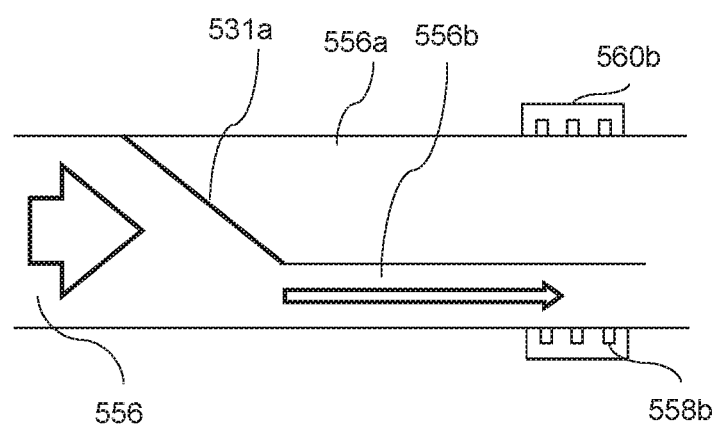
FIGS. 5a-5b are schematic views of an alternative variable thermal mass flow meter with multiple sub-channels.
Figure 5B:
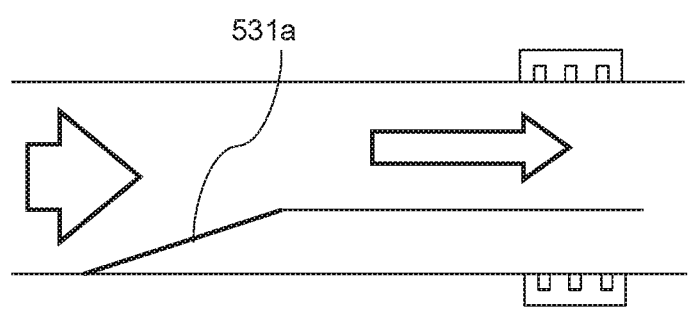

FIGS. 5a and 5b show an alternative way of adjusting the cross-sectional area of a portion of the flow channel 556 using sub-channels. In this case, the modifiable channel portion comprises multiple sub-channels 556a, 556b in parallel such that the total cross-sectional area of the channel can be controlled by selectively obstructing the sub-channels 556a, 556b so that all flow is directed through a single sub-channel. In this case the selective obstruction is performed by a diverting valve 531a.

In this case, the sub-channels can be obstructed by closing the diverting valve 531a over all but one of the sub-channels 556a, 556b. In FIG. 5a, the first sub-channel 556a is occluded which directs the flow through the second flow sub-channel 556b. In FIG. 5b, the second flow channel 556b is occluded which directs the flow through the first flow sub-channel 556a only. In this case, each there is a thermal mass flow meter 558b, 560b positioned in each sub-channel and each sub-channel has a different cross-sectional area which means that different sub-channels provide different cross-sectional areas.

It will be appreciated that in some embodiments, thermal mass flow meters may be placed in series as well as in parallel. For example, in the embodiment of FIG. 5a a thermal mass flow sensor may be positioned in advance of the sub-channel portion to be able to measure the mass flow through the full-bore flow channel.

It will be appreciated that using sub-channels may allow the cross-sectional area to be adjusted or modified to one of a set of discrete values.

Two-Position Design

Figure 6A:
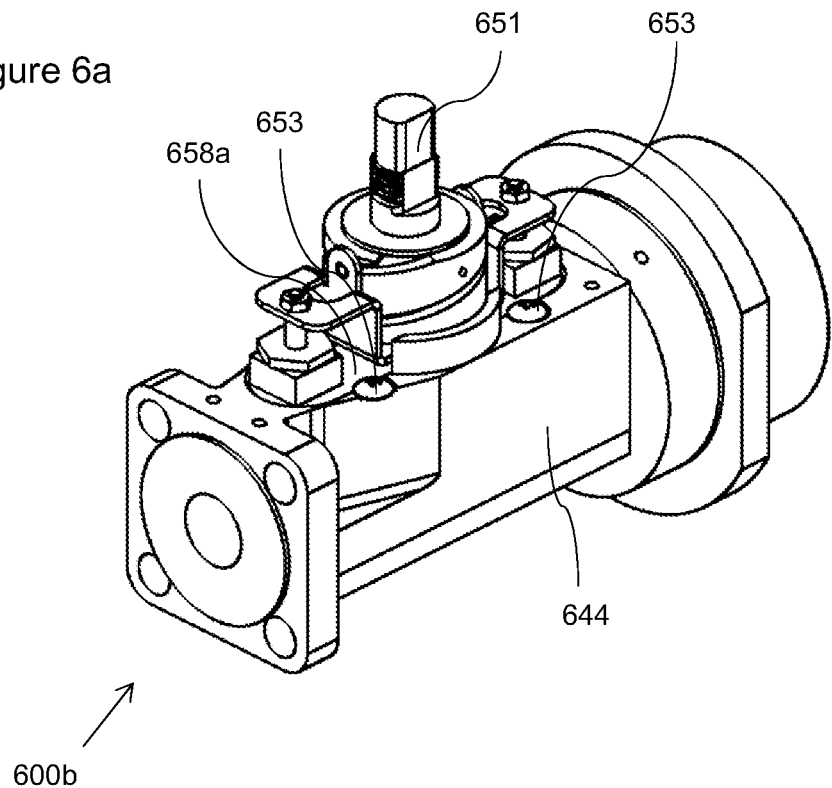
FIG. 6a is a perspective view of an embodiment which is manually adjustable between two configurations.
Figure 6B:
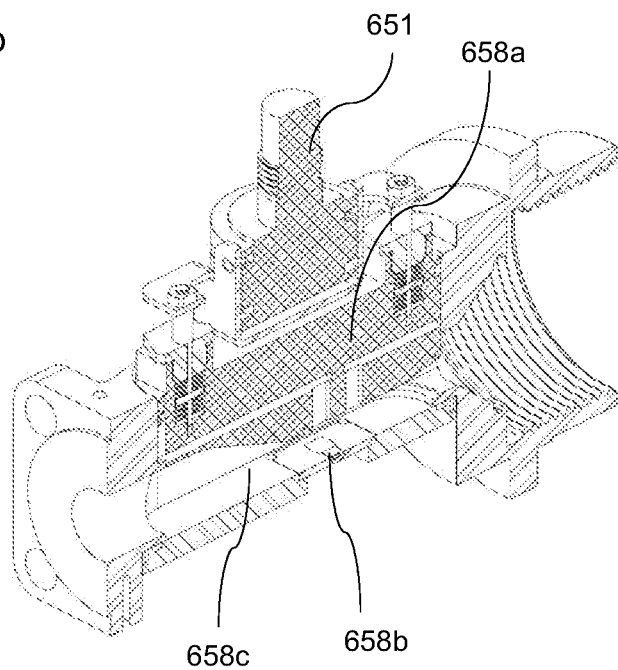
Figure 6C:
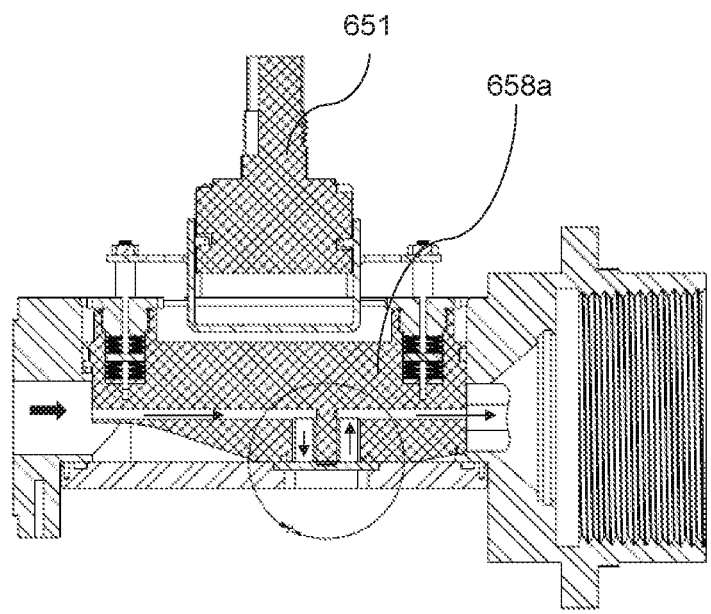
FIG. 6c is a longitudinal cross-section view of the embodiment of FIG. 6a when the plunger is in the low-flow configuration.
Figure 6D:
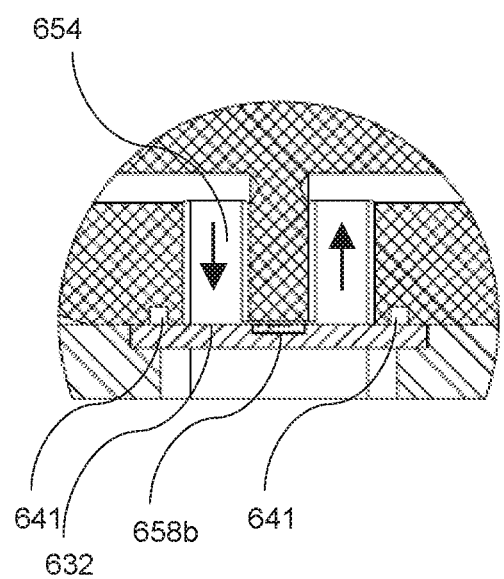
FIG. 6d is a detail view corresponding to the circle labelled 'H' in FIG. 6c.
Figure 6E:
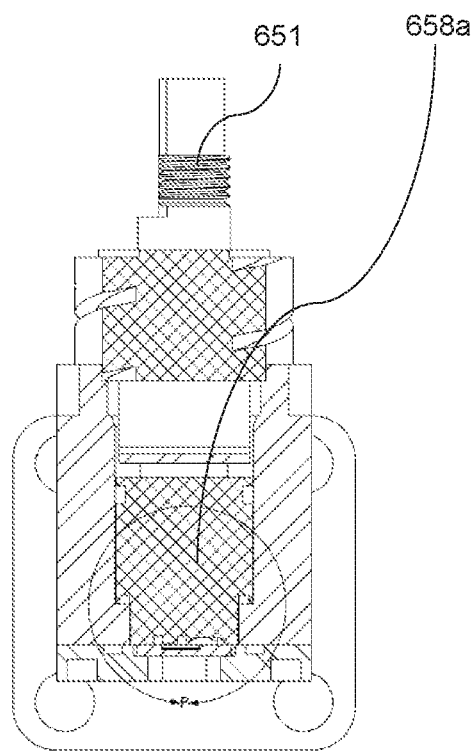
FIG. 6e is a transverse cross section of the embodiment of FIG. 6a when the plunger is in the low-flow configuration.
Figure 6F:
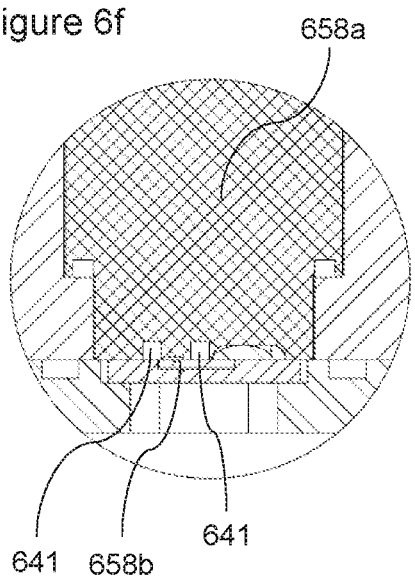
FIG. 6f is a detail view corresponding to the circle labelled 'P' in FIG. 6e.
Figure 6G:
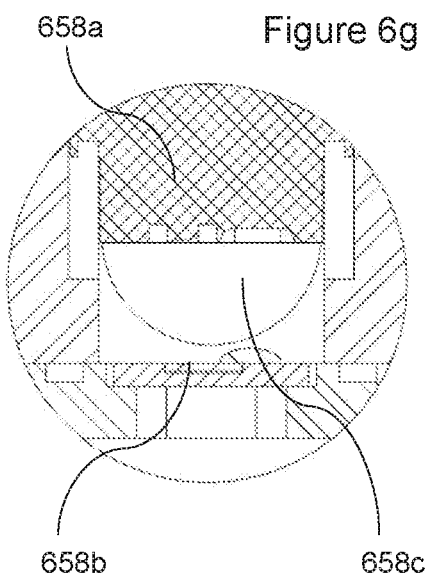
FIG. 6g is a detail view corresponding to the circle labelled 'H' in FIG. 6c but when the plunger is in the high-flow configuration.
Figure 6H:
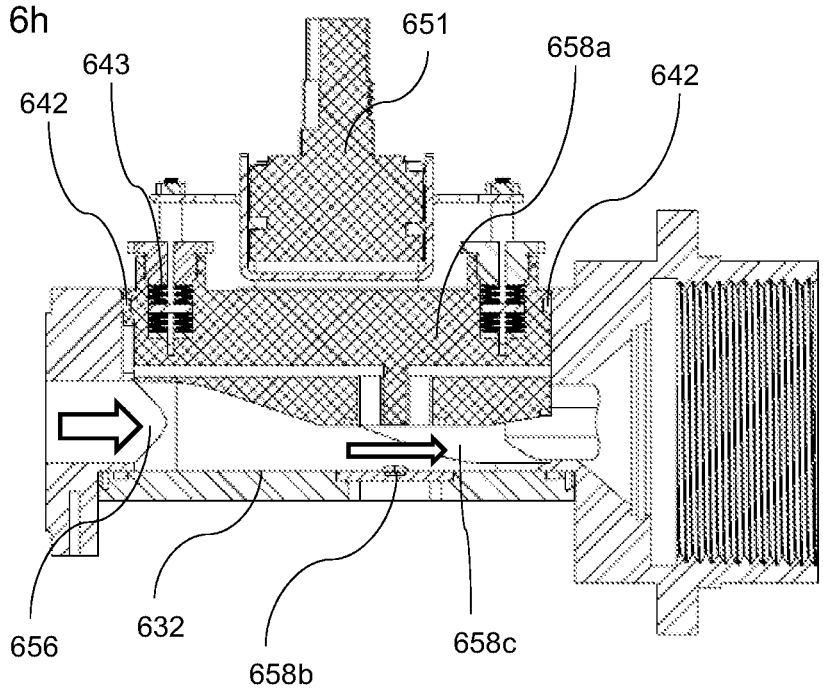
FIG. 6h is a longitudinal cross-section view of the embodiment of FIG. 6a when the plunger is in the high-flow configuration.
Figure 6I:
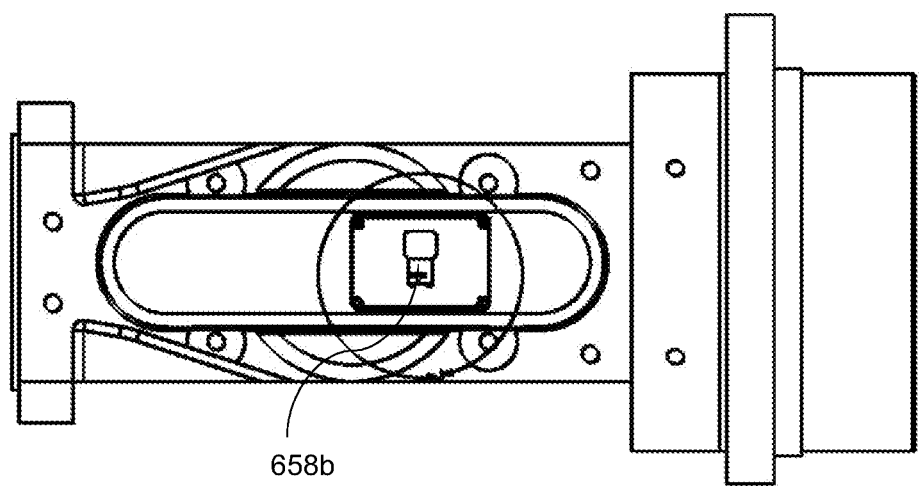
Figure 6J:
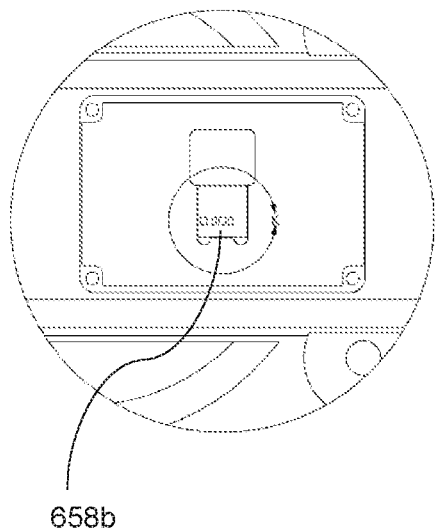
FIG. 6j is a detail view corresponding to the circle labelled 'J' in FIG. 6i.
Figure 6K:
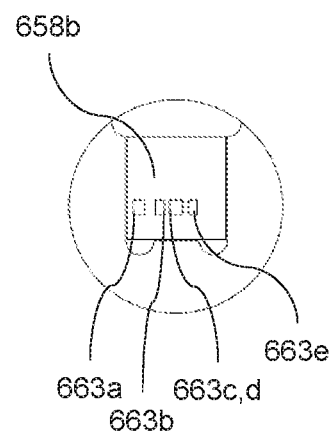
FIG. 6k is a detail view corresponding to the circle labelled 'K' in FIG. 6j.
Figure 6L:
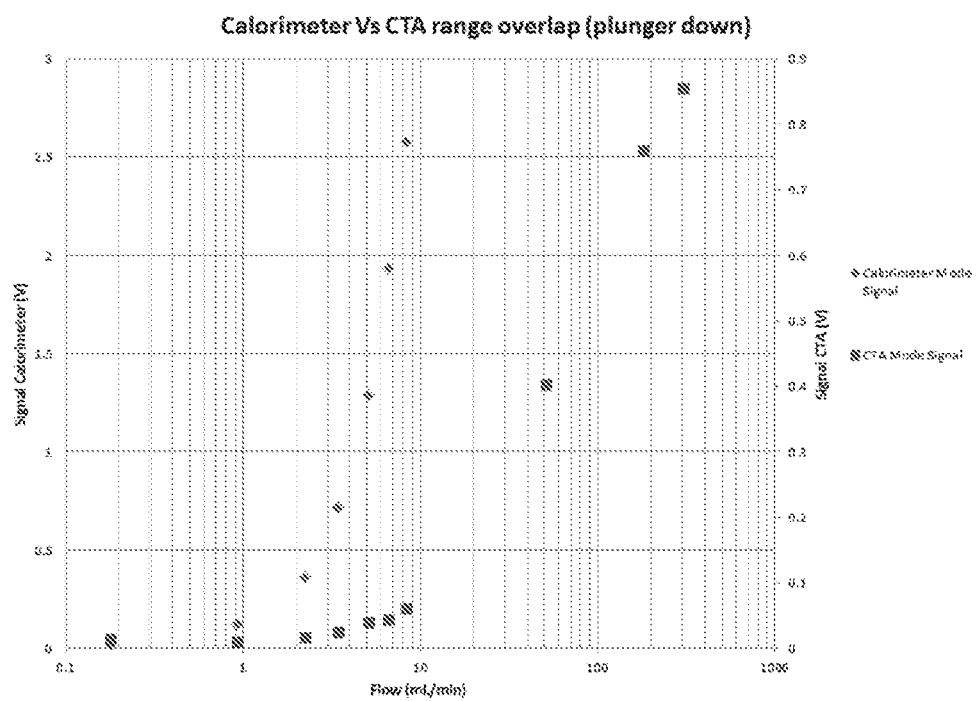
FIG. 6l is a graph showing data of the response of the embodiment of FIG. 6a in a calorimeter mode and an anemometer mode.

FIGS. 6a and 6k show a variable mass flow module. The structure of the module is similar to that of FIG. 3b. Such a variable thermal mass flow sensor may form part of, for example, a portable or a broad-spectrum unit. In this case, the gas meter is configured to allow two positions of the adjustable obstruction.

In this case, the variable mass flow sensor comprises:
a channel 656 comprising an adjustable and modifiable portion 658c with an adjustable and modifiable cross-sectional area; and
a thermal mass flow meter 658b positioned within the adjustable and modifiable channel portion 658c and which measures the mass flow rate by heating a portion of the flowing fluid and then recording how that heat is dispersed by the flow,
wherein the gas meter 658 is configured to control the cross-sectional area of the adjustable and modifiable channel based on the gas flow rate.

In this case, the system is configured to be modifiable between two discrete (e.g. binary) positions. This may help ensure that the cross-sectional area is more reproducible by limiting the number of options available.

The sensor in this case consisted of a PCB mounted MEMs chip attached to an aluminum body, which houses an adjustable obstruction 658a (a plunger in this case). The plunger can be actuated so that it sits firmly against the chip/PCB surface or lifted away from the chip (e.g. by up to 9 mm). The MEMs chip is attached to the PCB by wires, which are held in place by a globule of epoxy. In this case, the plunger is configured to be manually actuated through rotation of manual actuator 651. The manual actuator in this case comprises a male helical screw, which engages with a corresponding female helical screw with a U-shaped plunger carrier 652 which is attached to the plunger. When the manual actuator 651 is rotated with respect to the plunger carrier 652, the plunger 658a moves within the channel. It will be appreciated that other manual actuators may be used such as levers. Other embodiments may be configured to change configurations in response to a user input (e.g. a switch, using computer user interface).

In this case, the plunger carrier is resiliently attached to the plunger via a number of springs (a series of Belleville washers 643 in this case). These help maintain the plunger in alignment as it is being moved between positions. It will be appreciated that other two-position embodiments may be configurable automatically.

When in the constricted configuration the plunger abuts the opposing surface of the channel. When in the open configuration, the top of the plunger abuts one or more stops 653. The stops in this case are screw heads mounted in the body 644 of the flow module and which lie over the opening in which the plunger 653 is inserted.

While the plunger 658a is against the chip surface (see FIGS. 6c, e and details in FIGS. 6d, f), flow is limited to an alternative flow path 654 recessed into the plunger (with a cross section of 0.2 mm$^2$ in this case over the MEMs chip 658b). The plunger in this case is sealed only to allow flow through this area by an O-ring face seal 641 between the chip/PCB and plunger 641. The flow was kept confined in the plunger body by sliding O-ring seals (e.g. 642) to prevent leaks out to the surroundings.

In this case, when the plunger is down, gas flow is permitted through a channel within the plunger. That is, like the embodiment of FIG. 3b, the alternative flow path 654 in the plunger in this case comprises an inlet closed channel portion, an open channel (sensor) portion and an outlet closed channel portion. The open sensor portion of the channel is configured to be enclosed by the sensor supporting surface 632 and the sensor when the plunger is fully down thereby creating a fully closed channel alterative flow path 654 when the plunger is in this configuration.

While the plunger is raised (see FIG. 4b), the top of the plunger abuts stops above the plunger. Gas flow is facilitated between the bottom surface of the plunger and the surface housing the thermal sensor. The flow was kept confined in the sensor body by sliding O-ring seals to prevent leaks out to the surroundings. In this embodiment, when the plunger is raised, the channel through the plunger is blocked by the inlet and outlet to the channel being above the main channel and so flow is directed below the plunger.

In this case, the MEMs chip consists of 5 RTDs (resistance temperature detectors) elements aligned in a row on a glass substrate. The 5 elements are as follows: sensor 1 (663a); sensor 2 (663b); sensors 3 and 4 (663c, d) that act in consort in this embodiment; and sensor 5 (663e).

The sensing elements can either act as small heaters or as temperature sensors depending on the amount of electrical power provided to them. One upstream sensor (sensor 1 (663a) in the FIG. 4f) serves as an ambient gas flow temperature sensor and reads the temperature of the gas as it comes out of the vent. The four downstream elements (sensor 2-5 (663b-e) in the FIG. 4f) are located over a very thin backing of glass to reduce the thermal capacitance of the sensors and increase the response speed. The glass may be around 1-2 millimeters or less in thickness.

Depending on the electrical configuration of the four downstream elements (i.e. which are used as heaters and which are used as temperature sensors) various flow measurement schemes can be used.

In this case, the MEMs chip can operate in one of two modes: calorimetry mode and anemometer mode (or Constant Temperature Anemometry, CTA). This extends the range of flows detectable for a fixed cross-sectional channel. For embodiments with discrete cross-sectional options, this means that the difference in cross-sectional area between the discrete options can be bigger than would be available if the MEMs chip could only operate in one of the calorimetry and anemometer modes. In this case, this allows two discrete positions to span a wide range of flow rates.

In this case, in the calorimetry configuration sensor elements 3 and 4 (663c, d) are heated with between 5-10 mW of power. The heaters are kept at a constant temperature above the ambient gas temperature. This helps ensure that the heaters are neither going to burn out in no flow nor be cooled too much in high flow. Sensor elements two and five measure the temperature of the gas on either side of the heating elements. If there is flow present the downstream sensor five will be at a higher temperature then sensor two since the heat from the heater elements will be blown downstream. From the temperature difference of sensor elements two and five the flowrate can be determined. Due to the very thin substrate under these four elements the heat that is transferred from the heater to the sensor is transferred almost entirely though the gas and not through the substrate, this make the sensor much more sensitive to very small gas flows. This configuration is very sensitive to low flow but the heat can be blown away too fast in high flow to sufficiently heat the downstream sensor. Because of the calorimetry configuration is less applicable to large flows.

In the anemometer configuration sensor elements three and four are kept at a constant temperature above the ambient gas with a feedback loop. The flow rate is measured by determining how much power is provided to the two sensors to keep them at an elevated temperature. As the flow rate increases more heat is blown off the sensor elements so the power required to keep them at a constant temperature increases. This configuration is not sensitive to very low flows but allows measurement of high flows. Sensors two and five are not used in this configuration. In this case, a Constant Temperature Anemometer Configuration (CTA) is used. In other embodiments, a Constant-Power Anemometer Configuration (CPA) may be used.

Constant-temperature anemometers may be advantageous in certain scenarios because of their high-frequency response, low electronic noise level, immunity from sensor burnout when airflow suddenly drops, compatibility with hotfilm sensors, and their applicability to liquid or gas flows.

Constant-power anemometers generally do not have a feedback system and so may be easier to construct. Temperature is simply proportional to flowrate. However, although they can be used, they are generally less popular because their zero-flow reading is not stable, temperature and velocity response is slow, and temperature compensation is limited.

To read flow measurements over the entire dynamic range the sensor needs to operate in four different states. These states from low flow to high flow are:

1. Plunger fully down calorimeter sensor mode
2. Plunger fully down CTA sensor mode
3. Plunger fully up calorimeter sensor mode
4. Plunger fully up CTA sensor mode The overlap between calorimeter and CTA modes sensing range is approximately 25% of the full calorimeter scale (see FIG. 61). This overlap is not dependent on the plunger height. The sensing range signal overlap between the plunger fully down and fully up is approximately 5% the plunger up calorimeter full scale value. Since all the measurement ranges overlap, the sensor may accurately measure the full range of flow from one bubble in ten minutes to over 300 cubic meters per day.

In this case, the gas meter is configured to determine calorimeter and CTA values all of the time. That is, the chip can simultaneously be both a calorimeter and anemometer. The gas meter then decides (e.g. with a state machine) which value to use based on a predetermined criterion. For example, the criteria may be based on a predetermined set point related to a crossover in sensitivity at a particular flow rate value. It will be appreciated that the output value may be calculated based on both the determine calorimeter and CTA values.

The range overlap between the plunger fully down and fully up is determined by the maximum 1 inch (25.4 mm) of $H_2O$ of back pressure when measuring low flows with the plunger down. The flow measurement still has plenty of measurement range left when the plunger is lifted to keep the back pressure low.

Two plunger states (fully open and fully closed) may greatly simplify the plunger actuation and positioning requirements. This will increase the repeatability of the sensor since mid-position plunger locations are not required so the plunger can be moved until it hits the hard stops at the top and bottom of its travel. This may help remove much of the uncertainly about maintaining consistent flow channel size between measurements.

Experimental Results for Two-Position Design

This device was tested and should be able to measure flow of less than one bubble in ten minutes. The low flow apparatus used to test this device can reliably create flows only greater than one bubble in three minutes so direct measurement of flow at the device's sensitivity limit was not possible. Mathematical extrapolation was used from the experimental results to approximate the flow sensitivity of the device down to the minimum level.

The minimum detectible flow signal was defined as the signal strength that is two standard deviations of the signal noise above the zero point average. This allows a 95% confidence level that if the signal is at this level it represents an actual flow.

The theoretical minimum detectible flow can be improved by taking a moving average of the raw signal, which serves to reduce the high frequency noise. Taking a relatively short moving average of 1 and 5 seconds a detectible flow of 0.054 and 0.027 bubbles per minute could be resolved with the current prototype. This corresponds to one bubble in ~18 min and ~37 min respectfully. These values are accurate assuming that the true zero point is known exactly. There will be slight drifts in the zero point due to plunger pressure, time between calibration and temperature of the device. Most of these zero point errors can be calibrated out but some will always remain. Based on these results however even with slight zero point drifts there is a high confidence that the device should be able to detect flows of one bubble in ten minutes.

The dynamic range of the flow sensor is the difference between the minimum and maximum flow the sensor can resolve. As discussed above the minimum flow of one bubble in ten minutes (approximately 0.04 ml/min) can be detected at the low end. At the high end flows in excess of 300 cubic meters per day (210,000 ml/min) can be measured. FIG. 61 shows the detectable signal for a range of flow rates in calorimeter and anemometer modes. Calorimeter mode is shown as diamonds (values correspond to left y-axis) and anemometer (or CTA) mode is shown as squares (values correspond to right y-axis).

Test equipment to accurately produce flows in the high flow range was not available at the time of testing so high flow values were simulated. Using the test data gathered from lower flows (0-300 ml/min) the sensor response to high flows can be simulated. From these simulations the full dynamic range required of the sensor from 0.04 ml/min to 210,000 ml/min can be easily achieved. Measurement of flows higher than 210,000 ml/min can be achieved. As flow increases the back pressure may become the limiting factor so it is expected that the full flow measurement range of the device will not be limited by flow measurement but by back pressure. Controlling the configuration of the channel will mitigate this.

Modular Unit

FIGS. 7a-7e shows an embodiment of a gas meter comprising:
- a channel 756 comprising a modifiable channel portion 758c with a modifiable cross-sectional area; and
- a thermal mass flow meter 758b positioned within the modifiable channel and which measures the mass flow rate by heating a portion of the flowing fluid and then recording how that heat is distributed by the flow,
- wherein the gas meter is configured to control the cross-sectional area of the modifiable channel.

Figure 7A:
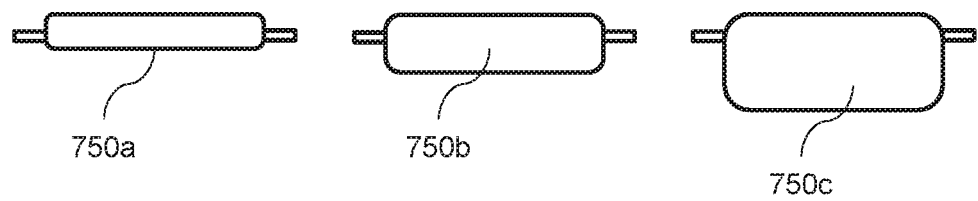
FIG. 7a is a schematic side view of a number of plungers, each configured to provide a different cross sectional area to the channel.
Figure 7B:
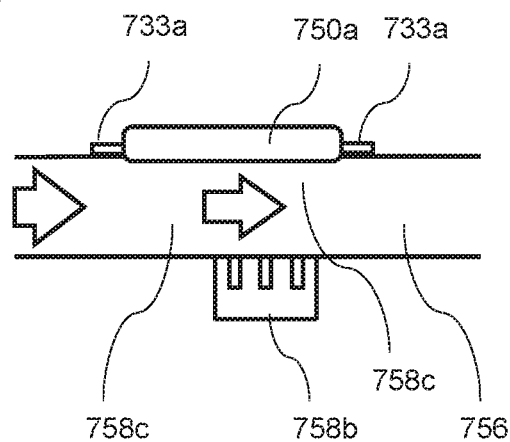
Figure 7C:
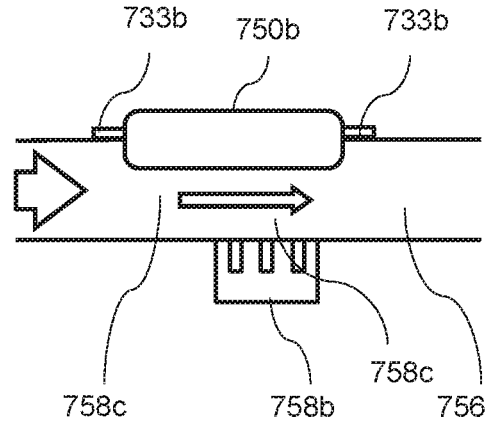
Figure 7D:
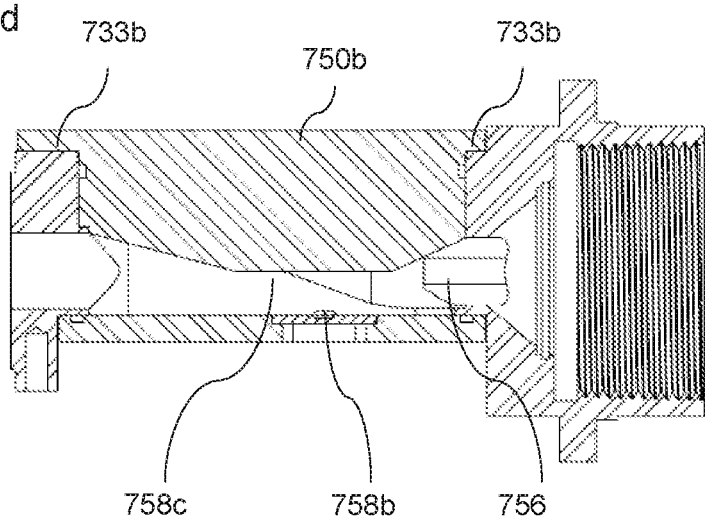
FIG. 7d is an engineering drawing cross-section the embodiment of FIG. 7c.
Figure 7E:
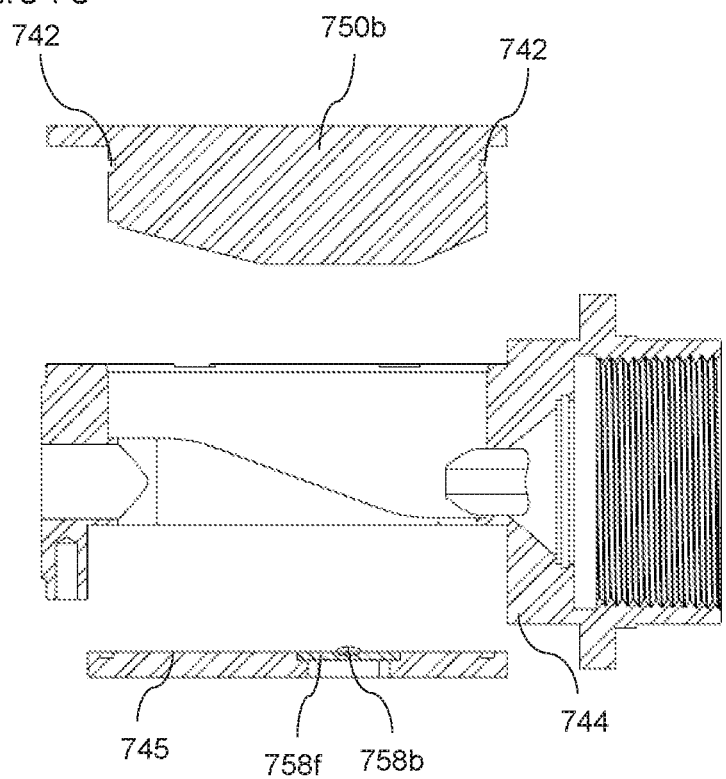
FIG. 7e is an exploded-view cross-section the embodiment of FIG. 7c.

In particular, FIG. 7a is a schematic side view of a number of plungers, each configured to provide a different cross sectional area to the channel. FIGS. 7b and c are perspective views of an embodiment, which comprises one of the plungers of FIG. 7a.

In this case, the channel comprises a replaceable channel module portion (three replaceable channel module portions 750a-c are shown schematically in FIG. 7a). The replaceable channel module portion is configured to provide the modifiable channel portion with a predetermined and fixed cross-sectional area such that the cross-sectional area of the channel can be modified by replacing the replaceable channel module portion with another the replaceable channel module portion with a different predetermined and fixed cross-sectional area. That is, each module has a fixed and predetermined cross sectional area.

In this case, the main gas meter unit (comprising the body 744 and PCB carrier 745) comprises an open channel and the replaceable channel module portion comprises a fixed plunger 750a-c and at least one connector 733a, b for fixing to the main gas meter unit. When the replaceable channel module portion 750a-c is connected to the main gas meter unit via the connectors 733a, b, the cross-sectional area of the modifiable channel portion 758c is provided with a predetermined cross-sectional area.

The replaceable channel module portions also comprise a seal 742 for ensuring a good connection with the body 744 of the gas meter flow module.

The gas meter may determine the predetermined cross-sectional area in a number of ways. For example, the main unit may store information associating particular modules with particular predetermined cross-sectional areas. When the module is identified, the main unit may be configured to look-up the associated cross-sectional area value. The replaceable channel module portion can be identified using one or more of: a user entering which module has been inserted; the reading a code such as an RFID code, a bar code and/or an optical code (the reader may be on the main unit and the code on the plunger or vice versa).

The system may be configured to detect the position of the plunger using proximity sensors, for example, mechanical posts with capacitive sensors on the plunger body. It will be appreciated that the distance determined may be associated with one of a discrete number of possibilities. For example, if the sensor determined that the plunger was 24(±1) mm away but the modules available were 5, 10 and 25 mm, the system may determine that the distance is 25 mm based on the available modules. Alternatively or in addition, if the determined plunger distance is found not to correspond to one of the available replaceable channel module portions (e.g. a distance of 20(±1) mm was measured), it may provide a warning to the user (e.g. to check that the replaceable channel module portion has been correctly connected).

The connectors in this case comprise screws. In other embodiments, the plunger (or other modular obstruction) may comprise clip or quick-release connectors. The replaceable channel module portion may comprise stops, which are configured to rigidly abut a rigid portion of the main gas meter unit to ensure that the cross-sectional area of the modifiable channel portion is reproducible when replacing modules. The PCB carrier in this case comprise metal. It is configured to house the PCB 758f, which in turn supports the sensor chip 758b.

Composition Sensing

In some embodiments, the gas meter may comprise a composition analyser configured to determine the make-up of the gases within the gas flow (e.g. for compliance purposes or for refining the flow rate measurements).

Figure 8A:
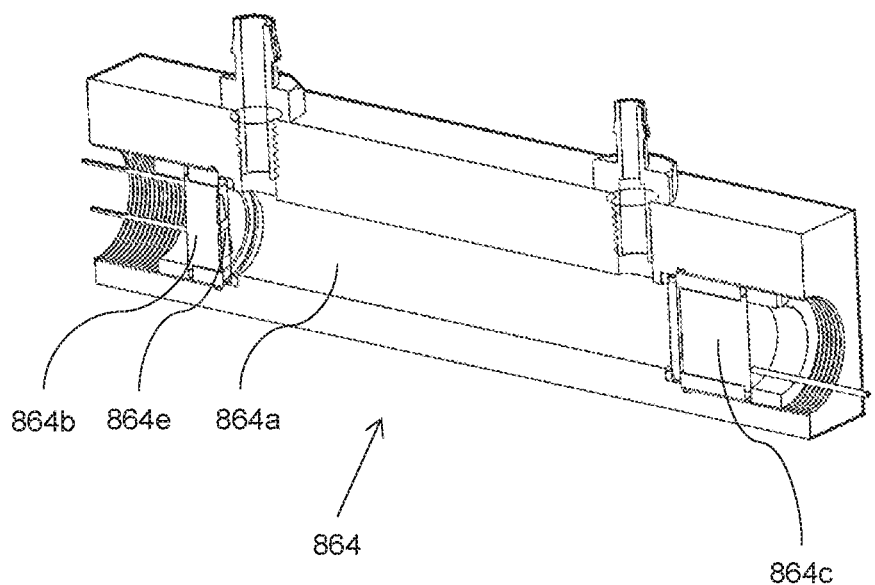
FIGS. 8a and b are respective perspective and cross-section views of a speciation analyser.
Figure 8B:
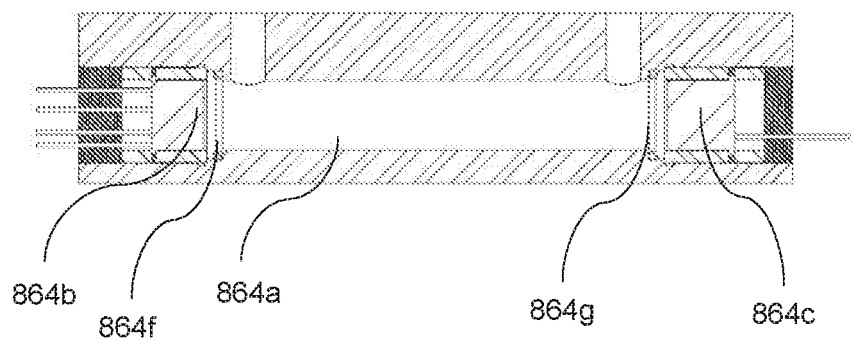

An embodiment of the gas composition detector 864 is shown in FIGS. 8a-b. Some embodiments may be configured to determine the level of gaseous hydrocarbons present in the flow. Methane is expected to be the major hydrocarbon but other higher order hydrocarbon gases may be present. In some cases, the sensor may be configured to read total hydrocarbon levels. In other embodiments, the sensor may also be configured to distinguish between the different hydrocarbons.

The low-level detection limit may be less than 1000 ppm. The sensor may have a dynamic range of 1,000-1,000,000 ppm with a sensitivity of around 100 ppm.

In this case, the gas composition detector 864 comprises a mid-infrared thermopile based sensor. The detection principle is that a specific gas absorbs light (in a small wavelength range) in proportion to the gas concentration. The higher the concentration of the gas the more light it will absorb.

This analyser consists of a sensor 864b, which can detect general light intensity. A filter 864e placed over the sensing element allows only a small range of wavelengths to pass through it and be measured. This allows the sensor 864b to be tuned to a specific gas detection wavelength. The sensor is illuminated with a pulsed broadband mid infrared source 864b with shines through the gas sample within analyser channel 864a. This channel has an inlet and an outlet for allowing flow through channel 864a Depending on the hydrocarbon concentration different amounts of light in the 3.2-3.5 µm wavelength region is absorbed by the gas. The sensor from which a concentration can be derived measures the absorption of light.

In this case, the sensor has two elements, one tuned to a wavelength of 3.375 µm (190 nm width) and the other tuned to 3.91 µm (90 nm width). The 3.375 µm channel is tuned to the wavelength of light absorbed by the hydrocarbon the other is generally outside of the absorption wavelength of most gases and is used to calibrate for the overall light intensity of the source.

The sensor used for this embodiment is the PY-ITV-DUAL-TO39 (3+1) manufactured by Pyreos Sensing Solutions™.

For testing, a gas cell was used which is a 5 cm long brass tube 9 mm diameter through which the gas flows. The gas cell has sapphire windows 864f, g on each end to contain the gas and allow the IR light into and out of the cell. The inside of the cell is polished to increase the amount of light that is received by the sensor. By using a polished tube as the gas cell there was no a need for refracting optics to shape the beam, this reduces gas cell complexity and cost.

Both the light source and the sensor were mounted to prototype development boards provided by Pyreos Sensing Solutions™. These boards allowed software control and recording of the various parameters of the source and sensor.

With this set-up, the sensor could detect methane concentrations as low as 100 ppm using a 5 cm long gas cell. A smaller detection limit could be achieved if a longer gas cell was used. This however would likely result in the higher concentrations not being resolved. The longer gas cell would absorb the light passing through so much that too little light would make it through the cell to be read by the sensor.

It was found that the temperature of the sensor affects the zero-point reading so it is expected that temperature compensation (or recalibrating the system with known gases before each measurement) would help with the zero point errors and improve both the measurement error and sensitivity. That is, the processor may be configured to store data, which relates the zero-point reading to the temperature. This data could be used to compensate for temperature changes at the time of measurement Significantly high concentrations of $CO_2$ in the gas mixture may also give false readings of hydrocarbons. This is likely due to the fringes/tails of the $CO_2$ infrared absorption band overlapping slightly with the reference channel on the sensor. The reference channel is at 3.91 μm and serves to indicate how bright the light source is so the source brightness can be compensated for in the detection software. As the concentration of the carbon dioxide increases the wavelength range over which it absorbs light gets broader. When the absorption frequency of carbon dioxide overlaps the reference channel the sensor behaves as if there is a weaker light source so it will under predict methane concentration.

Since high carbon dioxide backgrounds are expected in some applications, some embodiments may be to also specifically detect carbon dioxide so the under-prediction of hydrocarbons can be removed by calibration. Four-channel sensors are available that would be able to sense the required gases to enable this calibration.

In other embodiments, a gas property sensor may comprise a photoionization sensor, an infrared point sensor, an infrared imaging sensor, a semiconductor sensor, a laser spectrometer (e.g. a quantum cascade laser spectrometer) and/or a mass spectrometer.

Sensing Algorithm

The gas analysis algorithm in this case uses the Beer-Lambert absorption principle, which states that a certain amount of light at a specific wavelength will be absorbed by a species with an absorption feature at the same wavelength as the emitting light. The magnitude of the response will be equal to the emitted light, the amount of molecules the light passes through (path length and concentration), and the absorption coefficient of the molecular transition at that wavelength (line strength).

As noted above, certain embodiments may be configured to use a quad detector in the mid infrared to determine the concentration of methane, non-methane hydrocarbons, $CO_2$, and a reference line for light level. Other embodiments may be configured to use different channels.

In this case, the absorption-spectrum gas composition detection algorithm is configured to perform the following:

1. An infrared excitation source is toggled on and off at 10 Hz. (Other frequencies may be used)
2. Gas under analysis passes through an optical channel directly in line of the excitation source.
3. Multiple (e.g. four) absorption sensors are mounted opposite the excitation source on the other side of the optical channel. Each absorption sensor is sampled continuously (e.g. 1-10 KHz) while the excitation source is toggled.
4. The absorption sensor voltages are converted to absorption values in software, then to root-mean-square values.
5. Per-channel absorption RMS values are optionally individually temperature-corrected to a standard temperature (e.g. 20° C.).
6. Per-channel absorption values are reference-modified.
7. Reference-modified per-channel absorption values are mapped to gas composition values (ppm or % depending on scale) using individual linear transformations based on calibration constants. In this case, concentrations for carbon dioxide, methane and broadband hydrocarbons are logged and transmitted for analysis.

In this case, a microcontroller is configured to emit a 10 Hz drive signal at 3.3 V to periodically apply power to the emitter/heater device. Additionally, the MCU drives a voltage amplifier through a DAC to adjust the maximum voltage applied across the emitter terminals. This allows the response of the detectors to be determined in the absence of emitted light. This baseline can be accounted for so that the difference between the sensor response with the emitter being on and off being used to determine the concentration of gas.

Other Options

In addition to the oil and gas fields, gas meters such as these could be used in, for example, retail gas stations, measuring and monitoring gas storage tank venting constituents. That is, the gas meters described herein may be used in any instance or environment whereby venting fugitive gas emissions should be or need to be quantified and qualified. Indeed, the variable flow meter that is incorporated in the embodiments described above may have a wide variety of additional uses outside of the realm of SCVF and well remediation operations. That is, the flow meter will be able to be adapted anywhere where a varying flow rate will need to be assessed.

The technology may also be incorporated directly into wellheads to remotely run SCVF checks and mitigate the expense of sending personnel into the field to regularly monitor wells.

The sophisticated spectral component may also be modular. For example, the flow or pressure modules may be configured to allow different gas property modules to be attached (e.g. in different combinations). For example, a user may by a separate gas property module configured to detect a particular gas (e.g. methane or gasoline fumes); or be able to replace a simple IR spectrometer with a more sophisticated IR spectrometer (e.g. with greater sensitivity or broader spectrum). That is, the spectral module would be a "plug-and-play" module by itself or possibly connected to the basic portable unit.

Similarly, the gas property channel may form part of a gas property module with is separate from the flow module.

A further component would be a self-contained "solar" or equivalent rechargeable battery pack system for broad-spectrum or sentinel monitoring applications. Again, the battery pack would be a simple "plug-and-play" component to the basic unit.

It will be appreciated that although the above examples have been described for a point gas source, embodiments of the present technology may be used for gas sinks. For example, if the vent was at a lower pressure than atmosphere, embodiments may be used to determine the flow into the vent and the shut-in pressure (negative with respect to atmospheric).

Applications

Below is a non-exhaustive list of possible industrial applications for this technology.

Abandonment and Remediation: the technology may be used by oil and gas companies in well abandonment operations; more specifically proving the device with SCVF detection, evaluation, and remediation.

Regulatory Well Monitoring: the technology may be used to monitor and report SCVF as directed by AER Annual Well Inspections Directive and with the regulated requirement of 90 day SCVF testing and reporting window for new drills. It is projected that all oil company field offices may have more than one monitor for each field office.

Third Party Service Providers: the technology may be used by well testing and monitoring companies provide testing services to oil and gas companies for convenience with the regulatory well monitoring requirements. The device and web-based data access will be made available to these potential clients for their respective customers.

Environmental & Reclamation Companies: As with the well testing and monitoring companies above, the device and web-based data access will be made available Environmental & Reclamation Companies for their respective customers.

Petroleum Sector Expansion—Downstream, Petroleum retailers store bulk volumes of fuel products in aboveground or underground tanks, vented to atmosphere. It is a regulatory requirement of the environmental regulator of each Province to monitor, record and verify fuel volumes from delivery to sales. Each retailer must record a "shrinkage volume factor" which must correct and prove any volumetric discrepancy is due to fugitive vapour venting to the atmosphere and not a liquid fuel leak. Manually dipping the bulk fuel tanks and arithmetically calculating the net fuel volumes is the current method of recording and reporting. A "rule-of-thumb" shrinkage factor is given to each retailer by the fuel supplier to attempt to correct any volumetric discrepancy. The present technology may be a more accurate determination of fugitive emissions venting from fuel tankage.

Municipal: As with the fuel retailers, fugitive emissions venting from landfill sites may be more accurately monitored and reported by the present technology to help prove, qualify and quantify the methane and other associated vapours into the atmosphere.

Other Opportunities: The present technology may be applied to other industries where fugitive gas emissions are vented to atmosphere such as breweries, distilleries, pulp and paper, and mining industries.

In general, devices disclosed herein may perform one of more of the following: optically detect the presence of, measure the flow rate of, and identify the characteristics of venting fugitive gas emissions. Specifically the device may provide a spectral analysis of emission gas constituents; selective detection of the presence of venting hydrocarbons; measurement of venting emissions flow rates, the measurement of shut-in and flowing venting system pressures and/or the venting system temperatures. The flow rates may be corrected, relative to the detection of the gas constituents and standard temperature and pressure (STP). Disclosed devices may be configured to collect such data electronically and transmit via various telemetry systems, to a secure remote data network for reporting, access, evaluation, real-time monitoring and archiving as required.

Although the present invention has been described and illustrated with respect to preferred embodiments and preferred uses thereof, it is not to be so limited since modifications and changes can be made therein which are within the full, intended scope of the invention as understood by those skilled in the art.

The invention claimed is:

1. A gas meter comprising:
a channel comprising a modifiable channel portion with a modifiable cross-sectional area, wherein the cross-sectional area of the channel portion is modifiable by adjusting the position of a plunger to control the velocity through the modifiable channel portion for a given flow rate; and
a thermal mass flow meter which is positioned within the modifiable channel, and which is configured to measure the mass flow rate by heating a portion of the flowing fluid and then recording how that heat is dispersed by the flow;
wherein the gas meter is configured to operate in four states, the four states comprising:
a first state in which the plunger is fully down, and the thermal mass flow meter is in a calorimeter sensor mode;
a second state in which the plunger is fully down, and the thermal mass flow meter is in a Constant Temperature Anemometer sensor mode;
a third state in which the plunger is fully up, and the thermal mass flow meter is in the calorimeter sensor mode; and
a fourth state in which the plunger is fully up, and the thermal mass flow meter is in the Constant Temperature Anemometer sensor mode.

2. The gas meter according to claim 1 wherein the gas meter is configured to control the cross-sectional area of the modifiable channel portion based on the gas flow rate such that at high flow rate the cross-sectional area of the modifiable channel portion is larger than at low flow rate.

3. The gas meter according to claim 1 wherein the dynamic range of the gas meter is greater than 20,000,000, wherein the dynamic range is defined as the ratio of the highest measureable flow rate to the lowest measureable flow rate.

4. The gas meter according to claim 1 wherein the modifiable channel portion is streamlined to promote laminar flow across the flow meter.

5. The gas meter according to claim 1 wherein the gas meter is configured to control the cross-sectional area of the adjustable channel based on the measured mass flow rate.

6. A gas meter according to claim 1 wherein the flow meter is configured to measure a flow of gas to provide a raw gas flow measurement and wherein the gas meter further comprises:
at least one gas property sensor configured to determine one or more properties of the gas and the environment;
wherein the gas meter is configured to provide a compensated gas flow measurement by adjusting the raw gas flow measurement based on the determined one or more properties of the gas and the environment.

7. The gas meter according to claim 6 wherein the one or more determined properties of the gas comprise one or more of: the temperature of the gas; the pressure of the gas; the ambient temperature; the atmospheric pressure; and the composition of the gas.

8. The gas meter according to claim 6 wherein at least one gas property sensor comprises one or more of: an IR spectrometer; a temperature sensor; and a pressure sensor.

9. The gas meter according to claim 6 wherein the at least one gas property sensor comprises an IR spectrometer configured to determine one or more of:
the concentration of non-hydrocarbons within the gas;
the concentration of methane in the gas; and
the concentration of hydrocarbons within the gas.

10. The gas meter according to claim 6 wherein the gas meter comprises a flow channel and a gas property channel, wherein the gas meter is configured to determine:
the flow rate from gas flow directed through the flow channel, and
at least one gas property from gas flow directed through the gas property channel.

11. The gas meter according to claim 1 wherein the overlap between calorimeter and CTA modes sensing range is 25% of the full calorimeter scale.

12. The gas meter according to claim 1, wherein the sensing range signal overlap between the plunger fully down and fully up is 5% of the plunger up calorimeter full scale value.

13. The gas meter according to claim 1, wherein the positions of the plunger when fully up and fully down are defined by hard stops at the top and bottom of its travel.

14. The gas meter according to claim 1, wherein the gas meter is configured to determine whether to use a calorimeter sensor mode value or a Constant Temperature Anemometer sensor mode value based on a predetermined criterion.

15. A method for determining the flow rate of gas, the method comprising:

flowing the gas through a channel, the gas channel having a modifiable channel portion with a modifiable cross-sectional area wherein the cross-sectional area of the channel portion is modifiable by adjusting the position of a plunger to control the velocity through the modifiable channel portion for a given flow rate;

measuring the mass flow rate through the modifiable portion using a thermal mass flow meter by heating a portion of the flowing fluid and then recording how that heat is dispersed by the flow; and adjusting the cross-sectional area of the modifiable portion and the thermal mass flow meter between four states, the four states comprising:

a first state in which the plunger is fully down, and the thermal mass flow meter is in a calorimeter sensor mode;

a second state in which the plunger is fully down, and the thermal mass flow meter is in a Constant Temperature Anemometer sensor mode;

a third state in which the plunger is fully up, and the thermal mass flow meter is in the calorimeter sensor mode; and a fourth state in which the plunger is fully up, and the thermal mass flow meter is in the Constant Temperature Anemometer sensor mode.

* * * * *